United States Patent
Splaine et al.

(10) Patent No.: US 9,832,155 B2
(45) Date of Patent: Nov. 28, 2017

(54) METHODS AND APPARATUS TO MONITOR IMPRESSIONS OF SOCIAL MEDIA MESSAGES

(71) Applicant: The Nielsen Company (US), LLC, Schaumburg, IL (US)

(72) Inventors: Steven Splaine, Tampa, FL (US); Stanley Woodruff, Palm Harbor, FL (US); Ronan Heffernan, Wesley Chapel, FL (US); Alexandros Deliyannis, Tampa, FL (US); Dustin Barlow, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 167 days.

(21) Appl. No.: 13/756,141

(22) Filed: Jan. 31, 2013

(65) Prior Publication Data

US 2014/0214978 A1    Jul. 31, 2014

(51) Int. Cl.
*H04L 12/58* (2006.01)
*G06Q 30/02* (2012.01)
*H04L 29/08* (2006.01)
*G06Q 50/00* (2012.01)

(52) U.S. Cl.
CPC ......... *H04L 51/32* (2013.01); *G06Q 30/0246* (2013.01); *G06Q 50/01* (2013.01); *H04L 51/08* (2013.01); *H04L 67/22* (2013.01)

(58) Field of Classification Search
USPC ............................... 705/14.41; 709/206, 224
See application file for complete search history.

(56) References Cited

U.S. PATENT DOCUMENTS

| | | | |
|---|---|---|---|
| 6,061,734 A | * | 5/2000 | London ................... H04L 63/10 380/29 |
| 6,434,614 B1 | | 8/2002 | Blumenau |
| 6,510,462 B2 | | 1/2003 | Blumenau |
| 7,302,481 B1 | | 11/2007 | Wilson |
| 7,406,434 B1 | * | 7/2008 | Chang .............. G06Q 10/06375 705/14.1 |

(Continued)

OTHER PUBLICATIONS

IP Australia, "Patent Examination Report No. 1," issued in connection with corresponding Australian Patent Application No. 2013203743, dated Oct. 14, 2014 (3 pages).

(Continued)

*Primary Examiner* — Backhean Tiv
(74) *Attorney, Agent, or Firm* — Hanley, Flight & Zimmerman, LLC

(57) ABSTRACT

Methods and apparatus are disclosed to monitor impressions of social media messages. An example method includes receiving at a server a request for media, the request addressed to a uniform resource locator, the request corresponding to a social media message to be presented with the media, and the request including a user identifier. The method also includes crediting the social media message with an impression based on the request being addressed to the uniform resource locator. The method also includes identifying that the impression corresponds to an original intended recipient of the social media message based on the user identifier matching a second user identifier stored in a list of subscribers that subscribe to receive messages from an original sender of the social media message.

24 Claims, 11 Drawing Sheets

(56) References Cited

U.S. PATENT DOCUMENTS

| | | | |
|---|---|---|---|
| 8,370,489 B2* | 2/2013 | Mazumdar et al. | 709/224 |
| 8,713,168 B2 | 4/2014 | Heffernan et al. | |
| 8,843,626 B2 | 9/2014 | Mazumdar et al. | |
| 8,849,998 B1* | 9/2014 | Merrill | G06Q 10/10 709/223 |
| 8,954,536 B2* | 2/2015 | Kalus | G06Q 30/02 709/217 |
| 9,055,021 B2* | 6/2015 | Heffernan | H04L 51/32 |
| 9,218,612 B2* | 12/2015 | Mazumdar | H04L 43/04 |
| 9,516,001 B2* | 12/2016 | Borland | H04L 63/0457 |
| 2001/0054029 A1* | 12/2001 | Williams | G06Q 30/02 705/52 |
| 2003/0046385 A1 | 3/2003 | Vincent | |
| 2005/0160002 A1* | 7/2005 | Roetter | G06Q 30/02 705/14.42 |
| 2008/0033784 A1* | 2/2008 | Chalimadugu | G06Q 30/02 705/7.29 |
| 2008/0140502 A1 | 6/2008 | Birnholz et al. | |
| 2008/0189169 A1* | 8/2008 | Turpin | G06Q 30/02 705/7.33 |
| 2009/0112997 A1 | 4/2009 | Parker, II et al. | |
| 2009/0210808 A1 | 8/2009 | West | |
| 2009/0248656 A1 | 10/2009 | Blinnikka | |
| 2010/0121676 A1* | 5/2010 | Jackson | G06Q 30/0203 705/7.32 |
| 2010/0228582 A1 | 9/2010 | King et al. | |
| 2010/0250370 A1 | 9/2010 | Jones et al. | |
| 2010/0332330 A1 | 12/2010 | Goel et al. | |
| 2011/0047013 A1 | 2/2011 | McKenzie, III | |
| 2011/0137733 A1 | 6/2011 | Baird et al. | |
| 2011/0225035 A1 | 9/2011 | Patwa et al. | |
| 2011/0225036 A1 | 9/2011 | Reddy et al. | |
| 2011/0231240 A1* | 9/2011 | Schoen | G06Q 30/0242 705/14.41 |
| 2011/0238673 A1 | 9/2011 | Carter et al. | |
| 2011/0258050 A1* | 10/2011 | Chan | G06Q 30/0269 705/14.66 |
| 2011/0289011 A1* | 11/2011 | Hull | G06Q 10/107 705/319 |
| 2011/0313987 A1 | 12/2011 | Ghosh et al. | |
| 2011/0313996 A1* | 12/2011 | Strauss | G06Q 30/0242 707/709 |
| 2012/0004959 A1 | 1/2012 | Benyamin et al. | |
| 2012/0011511 A1 | 1/2012 | Horvitz et al. | |
| 2012/0036080 A1 | 2/2012 | Singer et al. | |
| 2012/0047203 A1 | 2/2012 | Brown et al. | |
| 2012/0059722 A1 | 3/2012 | Rao | |
| 2012/0089455 A1* | 4/2012 | Belani | G06Q 30/0245 705/14.44 |
| 2012/0102113 A1 | 4/2012 | Chartier et al. | |
| 2012/0110027 A1 | 5/2012 | Falcon | |
| 2012/0143713 A1* | 6/2012 | Dittus | G06Q 30/08 705/26.3 |
| 2012/0151322 A1 | 6/2012 | Lindsay et al. | |
| 2012/0166520 A1 | 6/2012 | Lindsay et al. | |
| 2012/0173345 A1* | 7/2012 | Yanefski | G06Q 30/02 705/14.73 |
| 2012/0198072 A1* | 8/2012 | Kirsch | G06F 17/30876 709/226 |
| 2012/0215621 A1* | 8/2012 | Heffernan | G06Q 30/02 705/14.41 |
| 2012/0239809 A1 | 9/2012 | Mazumdar et al. | |
| 2012/0284340 A1* | 11/2012 | Young | G06F 17/3071 709/204 |
| 2013/0014137 A1 | 1/2013 | Bhatia et al. | |
| 2013/0066714 A1 | 3/2013 | Umeda | |
| 2013/0066725 A1 | 3/2013 | Umeda | |
| 2013/0073388 A1 | 3/2013 | Heath | |
| 2013/0080264 A1 | 3/2013 | Umeda | |
| 2013/0097285 A1* | 4/2013 | van Zwol | G06Q 30/02 709/219 |
| 2013/0124192 A1* | 5/2013 | Lindmark | G06F 17/274 704/9 |
| 2013/0218862 A1 | 8/2013 | Ghosh et al. | |
| 2013/0268351 A1* | 10/2013 | Abraham | G06Q 30/0246 705/14.45 |
| 2013/0282898 A1* | 10/2013 | Kalus et al. | 709/224 |
| 2013/0332604 A1 | 12/2013 | Seth et al. | |
| 2013/0346154 A1 | 12/2013 | Holz et al. | |
| 2014/0040020 A1 | 2/2014 | Shanmugam et al. | |
| 2014/0075018 A1 | 3/2014 | Maycotte et al. | |
| 2014/0089775 A1* | 3/2014 | Worsley | G06F 17/30575 715/230 |
| 2014/0156761 A1* | 6/2014 | Heffernan | H04L 51/32 709/206 |
| 2014/0214978 A1* | 7/2014 | Splaine | H04L 51/32 709/206 |
| 2014/0250223 A1* | 9/2014 | Heffernan | H04L 43/04 709/224 |
| 2015/0269611 A1* | 9/2015 | Heffernan | H04L 51/32 705/14.45 |

OTHER PUBLICATIONS

U.S., "Non-Final Office Action," issued in connection with corresponding U.S. Appl. No. 13/691,371, dated Oct. 9, 2014 (11 pages).

IP Australia, "Patent Examination Report No. 1," issued in connection with corresponding Australian Patent Application No. 2013203643, dated Nov. 13, 2014 (3 pages).

U.S., "Notice of Allowance," issued in connection with U.S. Appl. No. 13/691,371, dated Feb. 2, 2015 (5 pages).

U.S., "Non-final Office Action," issued in connection with U.S. Appl. No. 14/733,720, dated Sep. 1, 2015 (15 pages).

IP Australia, "Notice of Acceptance," issued in connection with Australian Patent Application No. 2013203743, dated Oct. 26, 2015 (2 pages).

IP Australia, "Notice of Acceptance," issued in connection with corresponding Australian Patent Application No. 2013203643, dated Jan. 5, 2016 (2 pages).

U.S., "Final Office Action," issued in connection with U.S. Appl. No. 14/733,720, dated Feb. 11, 2016 (16 pages).

IP Australia, "Certificate of Grant," issued in connection with application No. 2013203643 dated Apr. 28, 2016, 1 page.

* cited by examiner

| MEDIA UNIFORM RESOURCE LOCATOR | SOCIAL MEDIA MESSAGE | | SPONSORED MEDIA | | MESSAGE SENDER | |
|---|---|---|---|---|---|---|
| URL_X 118 | MESSAGE_X | 114a | IMAGE_1 | 112 | CELEBRITY_D | 504 |
| URL_Y 304 | MESSAGE_Y | 316 | | | CELEBRITY_D | 504 |
| URL_Z 306 | MESSAGE_Z | 318 | | | CELEBRITY_D | 504 |
| URL_Q 308 | MESSAGE_Q | 320 | | | CELEBRITY_A | 404 |
| URL_R 310 | MESSAGE_R | 322 | IMAGE_2 | 328 | CELEBRITY_B | 406 |
| URL_S 312 | MESSAGE_S | 324 | | | PERSON_C | 408 |
| URL_L 330 | MESSAGE_L | 336 | | | PERSON_E | 344 |
| URL_M 332 | MESSAGE_M | 338 | AUDIO_1 | 342 | PERSON_E | 344 |
| URL_N 334 | MESSAGE_N | 340 | | | CELEBRITY_F | 346 |
| URL_O 348 | MESSAGE_T | 354 | VIDEO_1 | 360 | CELEBRITY_G | 366 |
| URL_P 350 | MESSAGE_U | 356 | VIDEO_2 | 362 | CELEBRITY_H | 368 |
| URL_Q 352 | MESSAGE_W | 358 | VIDEO_3 | 364 | CELEBRITY_H | 368 |

METHODS AND APPARATUS TO MONITOR IMPRESSIONS OF SOCIAL MEDIA MESSAGES

FIELD OF THE DISCLOSURE

This disclosure relates generally to audience measurement, and, more particularly, to methods and apparatus to monitor impressions of social media messages.

BACKGROUND

Online social messaging services enable users to send social media messages to many users at once. In some examples, such social media messages are used to disseminate advertisements to a mass audience.

BRIEF DESCRIPTION OF THE DRAWINGS

FIG. 3 illustrates an example table that may be used to map corresponding uniform resource locators, social media messages, and media files.

DETAILED DESCRIPTION

Figure 1:
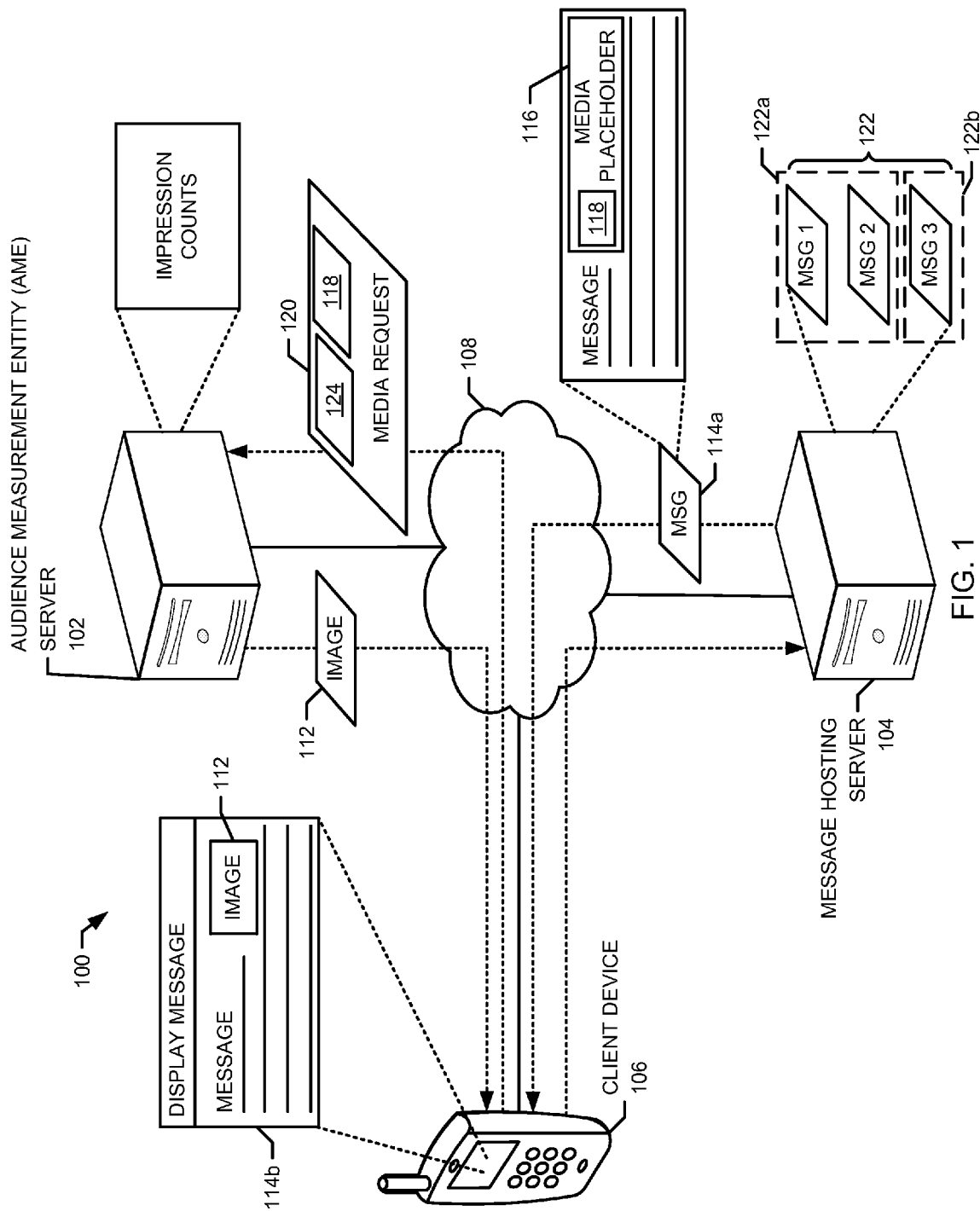
FIG. 1 is an illustration of an example environment in which examples disclosed herein may be implemented to monitor impressions of social media messages.

Social messaging has become a widely used medium in which users disseminate and receive information. Online social messaging services (such as Facebook or Twitter) enable users to send social media messages or instant messages to many users at once. A social media message may include links (e.g., uniform resource locators (URLs)) to content available on the Internet. A browser or messaging client retrieves the external content of the social media message by following the links (e.g., by sending a hypertext transfer protocol (HTTP) request to a URL specified in the message). The content retrieved by the URL(s) may include one or more different types of media such as text, images, audio and/or video. The message is constructed from the retrieved content and is then displayed by a client device. Some social messaging services enable users to "follow" other users (e.g., subscribe to receive messages sent by select users (e.g., via the Twitter® service)). For example, a user following (or subscribed to) a celebrity in the Twitter® service may receive indications via a client application (e.g., the TweetDeck® client application or any other social media messaging client application) executing on a client device when the celebrity sends or posts a social media message.

Social media messages may be used to convey many different types of information. In some examples, sponsored social media messages are used to convey information about a product or service. For example, a message sender may convey a social media message indicating that the message sender is eating at a certain restaurant. In other examples, social media messages are used to disseminate advertisements to a mass audience. For example, a sponsored social media message is a social media message for which a person (e.g., a celebrity or other person who is well known in the general population and/or well known within one or more sub-populations) is paid to send. Such sponsored social media messages are sent to followers and advertise, endorse, or otherwise convey a message in support of a product, a service, a company, etc. of the person or entity paying (or sponsoring) the message sender to send the sponsored social media message.

Monitoring impressions of advertisements, endorsements, or other messages delivered via social media messages is useful for generating impression statistics (e.g., reach and/or frequency) of the advertisements, endorsements, and/or other messages. In some examples disclosed herein, monitored social media messages are configured to be rendered (e.g., displayed or otherwise presented) with media (e.g., visual images, video, audio, text, etc.) and/or links (e.g., URLs) to such media that is served by one or more servers. End user devices reconstruct social media messages for presentation to users by retrieving the external media components from one or more servers. Examples disclosed herein monitor impressions to social media messages by tracking when media is requested (e.g., via one or more HTTP request messages) from server(s). To track such network requests for media from client devices (e.g., end user devices), an audience measurement entity (AME) server is used in disclosed examples to host the media, and to serve the media to the requesting client device(s). To detect instances of rendered social media messages, a different uniform resource locator (URL) is assigned to different social media messages (or component(s) thereof). When a client device receives a social media message sent by a message sender, the client device will send one or more requests to the AME server for corresponding media using the URL (uniform resource locator) assigned to the media. The AME server increments a corresponding counter every time it serves media for a corresponding one of the URLs. In this manner, the AME server uses the assigned URL as a unique identifier to determine which social media message should be credited with an impression.

For example, if a manufacturer elects to be a sponsor of messages sent by a recording artist, the manufacturer (or sponsor) enters into an agreement with the recording artist (e.g., a sender of one or more sponsored messages), in which the recording artist agrees to send one or more different social media messages promoting the manufacturer and/or its products. If the manufacturer sponsors three distinct social media messages (e.g., messages A, B and C), the manufacturer may want to compare the performances of the three social media messages (e.g., messages A, B and C) to one another and/or to other social media messages and/or to an expected or desired performance (e.g., message reach and/or frequency) of the three sponsored social media messages (e.g., messages A, B and C). In some examples, the AME server (or a third-party server contracted by the AME) hosts media that corresponds to an object (e.g., an avatar, text, audio or visual image) to be presented with each of the three social media messages A, B and C. In such examples, the AME creates different URLs for use in retrieving the media when the three different social media messages are being rendered by a client device. In such examples, the manufacturer assigns (e.g., embeds) each of the URLs to a different, respective one of the three social media messages A, B and C. When the recording artist sends his/her followers the social media messages A, B, C including their respective URLs, receiving user devices that open or otherwise access the message will retrieve the media using the corresponding URL embedded in the message being accessed. In particular, the receiving devices (e.g., client devices) send HTTP requests for the media using the URLs received in the social media messages. When the AME server receives a request for the media, it identifies which URL is being used to make the request and awards an impression credit to a corresponding one of the social media messages (e.g., by incrementing a corresponding counter) based on the identified URL. In this manner, as the AME server credits (or logs) impressions for respective ones of the URLs used for image requests. Because each URL is uniquely associated with a respective one of the social media messages A, B or C, the URL logs/counts reflect the number of impressions of each respective message A, B or C. The aggregate impression counts can then be used to track total impressions, reach, and/or frequency of impressions for each social media message A, B, C.

Examples disclosed herein may be used to measure audience exposure and/or interaction with advertisements, endorsements, and/or other information in social media messages and/or similar services accessed by users using service-specific applications (e.g., the TweetDeck® application) and/or web browsers. Service-specific applications (e.g., client applications for the Twitter® service) may be used on mobile devices (e.g., mobile phones, tablets, smart watches, etc.) or desktop computers and do not require use of a web browser. In some examples, techniques disclosed herein are particularly useful for non-web browser user interfaces. For example, a user may access social media messages via a messaging client application installed on a mobile device or other computing device rather than through a web browser. Although examples disclosed herein are described in connection with non-browser based messaging client applications that render social media messages, disclosed techniques may also be used in connection with browser-based interfaces used to present social media messages. Media files referred to in hypertext markup language (HTML) documents or web pages are not necessarily limited to visual images (e.g., files with file type extensions such as .bmp, .gif, .jpg, etc.) and may be visual images, text, audio, moving pictures, static images, etc.

FIG. 1 is an illustration of an example environment 100 in which examples disclosed herein may be implemented to monitor impressions of social media messages. The example environment 100 of FIG. 1 includes an audience measurement entity (AME) server 102, a message hosting server 104 and a client device 106. In some examples, the AME server 102 is implemented using multiple devices and/or the message hosting server 104 is implemented using multiple devices. For example, the AME server 102 and/or the message hosting server 104 may include disk arrays or multiple workstations (e.g., desktop computers, workstation servers, laptops, etc.) in communication with one another. In the illustrated example, the AME server 102 is in communication with the message hosting server 104 and/or the client device 106 via one or more wired and/or wireless networks represented by network 108. Example network 108 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication.

In the illustrated example, the client device 106 is used to receive, reconstruct and present social media messages. For example, a user following a message sender (e.g., a celebrity) may desire to read all social media messages conveyed by the message sender. In some examples, the user executes a non-browser based application on the client device 106 to request (e.g., via an HTTP request) from, for example, the message hosting server 104, all social media messages conveyed by the message sender. In some examples, the user signs in to a messaging service via the application with a user identifier (e.g., an example user identifier 124) in order to read and/or convey (or send) social media messages. The example user identifier 124 is then associated with the activities of the user. For example, requests to the message hosting server 104 from the client device 106 may include the user identifier 124. In some examples, the user identifier 124 of the message sender is displayed (or presented) along with the rendered social media message.

The client device 106 renders or reconstructs any social media messages (e.g., an example message (MSG) 114a, 114b) returned by the message hosting server 104. In the example of FIG. 1, the messages 114a and 114b are the same message at two different points in time. Message 114a is the message prior to being rendered on the client device 106. Message 114b is the message after rendering.

As described above, some social media messages may be sponsored. Some such social media messages may include only text. Some social media messages may include embedded media or links to external media in addition to, or instead of, text. In the illustrated example, the client device 106 requests and receives the example social media message 114a, or the social media message 114a is pushed to the client device 106 by, for example, the message hosting server 104. In the illustrated example, the client device 106 renders the message 114b with corresponding text and an image 112. For example, the text may indicate that the celebrity enjoys a sponsor's product, or it may convey a slogan associated with the product. The image may be a logo identifying the sponsor or product. In the illustrated example, the image 112 is an avatar image (e.g., a logo or other image accompanying a social media message) that is displayed along with the social media message 114b. However, examples disclosed herein may be used in connection with other types of media in social media messages including, for example, video, audio, text, streaming media, etc.

To enable tracking impressions of the social media message, the example social media message 114a of FIG. 1 includes a media placeholder 116 rather than the image 112 itself when the social media message 114a is sent by the message hosting server 104. In the illustrated example, the AME server 102 hosts the image 112, and the media placeholder 116 includes a uniform resource locator (URL) 118 usable to retrieve the image 112 from the AME server 102. In the illustrated example, to render the social media message 114a, the client device 106 sends a media request 120 for the image 112 to, for example, the AME server 102. In the illustrated example, the media request 120 includes the URL 118 and the user identifier 124 of the user. The user identifier 124 may include a handle, a screen name, a login or sign-on name, an email address, etc. In some examples, the AME server 102 uses the user identifier 124 to track user exposure to messages. For example, the AME server 102 can differentiate unique impressions from repeat exposures by checking if multiple media requests include the same user identifier 124. In some examples, the media request 120 includes a device identifier. For example, the media request 120 may include a Media Access Control (MAC) address, an Internet Protocol (IP) address, etc. The example AME server 102 may use the device identifier to track device exposures. The client device 106 displays or presents the social media message 114b and the image 112 (in place of the placeholder 116) when the AME server 102 serves or returns the image 112.

In the illustrated example, when a message sender (e.g., a celebrity) composes a social media message 122, that message 122 is sent to the message hosting server 104. The example message hosting server 104 hosts social media messages 122 that are subsequently sent to client devices, such as the example client device 106. In the illustrated example, the message hosting server 104 hosts sponsored social media messages 122a and non-sponsored social media messages 122b. In the illustrated example, sponsored social media messages 122a stored at the message hosting server 104 include a text portion and a media portion. The message hosting server 104 stores the text portion and corresponding media placeholders (e.g., similar to the media placeholder 116). As a result, the message hosting server 104 conserves memory space by storing placeholders for media rather than the media itself. In the illustrated example, the message hosting server 104 serves sponsored social media messages 122a and non-sponsored social media messages 122b in the same manner. For example, the message hosting server 104 processes a request for a social media message 122 similarly regardless of whether the social media message 122 is a sponsored social media message 122a or a non-sponsored social media message 122b. However, some social media messages (e.g., the social media messages 114a and 122a) include a URL (e.g., the URL 118) used by the AME server 102 to track impressions of the social media messages 114a, 122a.

In the illustrated example, the AME server 102 hosts media for presenting with social media messages 114a, 122a. For example, the AME server 102 of the illustrated example includes a media database that stores image files or other types of media files. Additionally or alternatively, the AME server 102 may be in communication with a geographically separate media database (e.g., a server of a third-party contracted by the AME) that hosts the image or other media files. In such examples, the AME server 102 retrieves images files (or other media files) from the separate media database to serve the media to the requesting devices. Alternatively, the separate media database may be provided with a server to serve the hosted media directly to the requesting devices.

The example AME server 102 of the illustrated example operates to track impressions of social media messages 114a and 122a. For example, to reconstruct or render the social media message 114a, the client device 106 uses the URL 118 corresponding to the media placeholder 116 to request the image 112. Thus, the AME server 102 receives the media request 120 for the image 112 from the client device 106. Using the URL 118 in the media request 120, the AME server 102 identifies the image 112 and the corresponding social media message 114a. The AME server 102 serves the image 112 to the requesting device (e.g., the client device 106). In addition, the AME server 102 credits (or logs) an impression of the social media message 114a based on the received URL 118. In this manner, the AME server 102 tracks total impressions and frequency of impressions for social media messages based on the URLs used by received media requests. In some examples, the URL may be for an element that is not displayed (e.g., a clear pixel) and, thus, the image file returned by the AME server 102 may not be seen by the end user but may still function to identify the corresponding social media message.

In some examples, multiple, different URLs may correspond to the same media hosted at the AME server 102. In such examples, the AME server 102 returns the same media when any of the associated media placeholder(s) is received. In some examples, a sponsor or advertiser may present the same embedded media (e.g., a same logo or other identifying image or media) across multiple sponsored social media messages to create uniformity and common identity across the multiple social media messages. Although media may be the same across multiple sponsored social media messages that are sent, assigning different URLs for the embedded media to the different messages as disclosed herein enables the AME server 102 to identify which social media message(s) to credit with impression(s) when media request(s) are received using different URLs. For example, an advertiser may produce an advertising campaign with three different social media messages A, B and C. Each of the three different social media messages A, B, C may include a unique media placeholder, but each of the three media placeholders may be associated with the same image, such as a logo of the sponsor. While the illustrated example describes one image associated with three different URLs, it is also possible for a single image to be associated with any number of URLs. For example, a sponsor celebrating its $100^{th}$ anniversary may have multiple different social media messages with different slogans and/or logos from the past. As a result, one image may be associated with one or more different URLs. In such examples, each of three different social media messages A, B and C sent by the same or different senders may be assigned a different image or media with a corresponding different URL. In other examples, the social media message may be sent through multiple, different spokespersons (Celebrity A, Celebrity B and Person C). The same media/image can be used by each spokesperson but the media of each message is retrieved by a different URL to enable tracking the effectiveness of different spokespersons.

In the illustrated example, the AME server 102 also hosts lists of users who follow (or subscribe to) corresponding sponsored message senders. In the illustrated example, the AME server 102 compares a user identifier included with a media request to user identifiers listed in one or more lists of followers (e.g., an example list of followers 228 of FIG. 2) to differentiate between expected (or anticipated) impressions (e.g., impressions from people listed as followers) and unexpected impressions (e.g., impressions from people not listed as followers). For example, a message sender (e.g., a celebrity) may have 200,000 followers (e.g., original intended recipients of a message). Thus, when the sponsor contracts with the message sender to convey social media messages, the sponsor expects or anticipates at least those 200,000 followers to be exposed to the social media message conveyed by the message sender. In other words, the sponsor has paid for at least 200,000 impressions for the social media message. In some examples, these 200,000 impressions are referred to as unearned media impressions because they are expected impressions. However, the AME server 102 logs an unexpected impression when a user who does not follow the sponsored message sender (e.g., somebody not included in the 200,000 followers) receives the social media message. For example, the social media message sent by the sponsored message sender (e.g., the celebrity) may be forwarded (e.g., re-posted, re-sent, re-conveyed, retweeted, etc.) to other persons that are not followers of the original message sender, or were not intended recipients of the original message. These unexpected impressions may sometimes be referred to as earned media impressions because they extend beyond the original intended recipients of the message. The reach of the social media message can then be determined by comparing the earned media impressions with the unearned media impressions.

Figure 2:
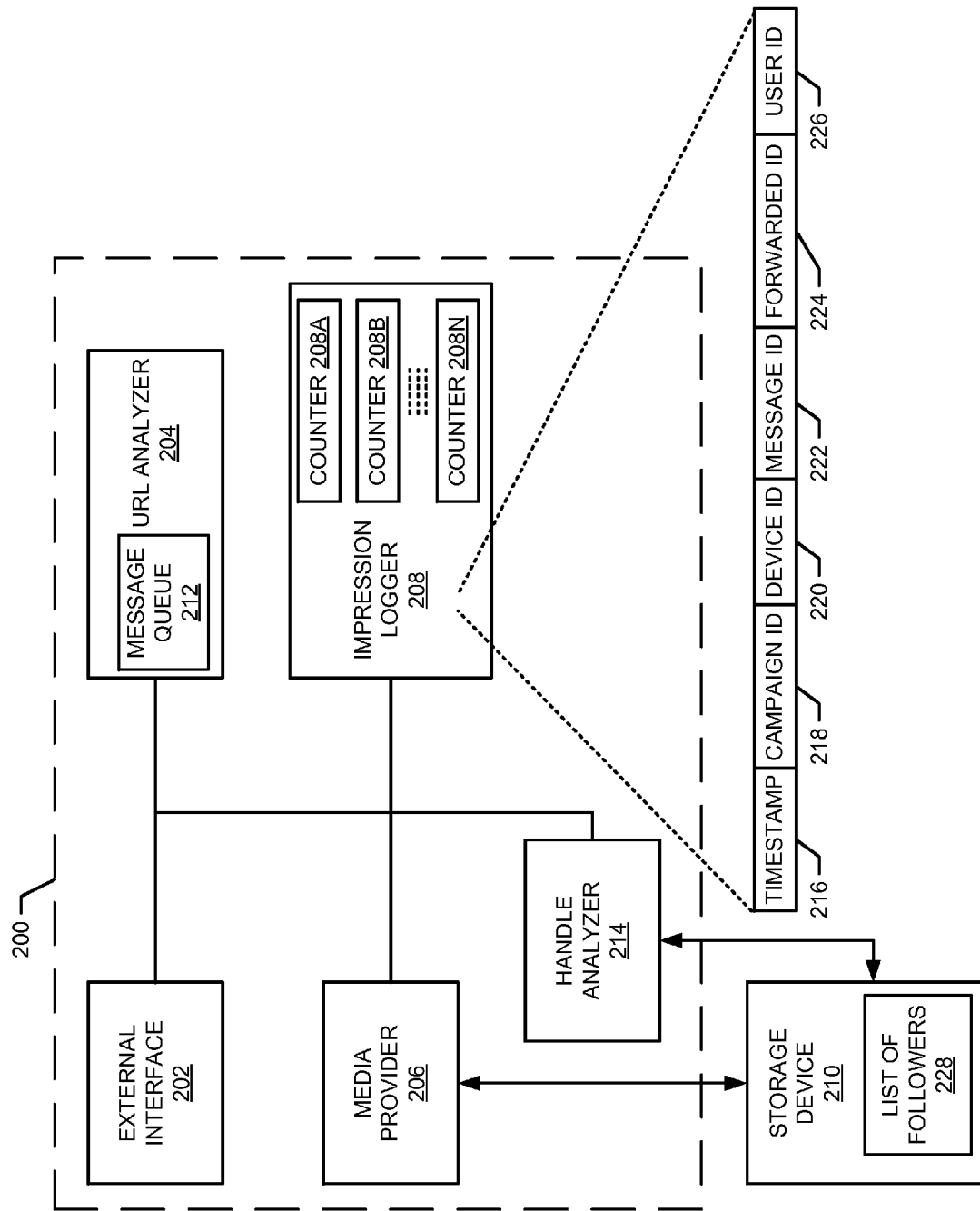
FIG. 2 illustrates an example social message tracker that may be used to log impressions for social media messages.

FIG. 2 illustrates an example social message tracker 200 that may be used to log impressions for social media messages (e.g., the messages 114a and 122a of FIG. 1). In the illustrated example, the social message tracker 200 includes an example external interface 202, an example URL analyzer 204, an example media provider 206, an example impression logger 208 and an example handle analyzer 214. In the illustrated example, the social message tracker 200 is in communication with an example storage device 210 to store media. In some examples, the social message tracker 200 is in communication with the storage device 210 via one or more networks and/or local communication interfaces. In some examples, the storage device 210 is local to the social message tracker 200 and/or integrated therein. In some examples, the social message tracker 200 is included in the audience measurement entity (AME) 102 of FIG. 1. In other examples, the social message tracker 200 is separate from the AME server 102 and in communication with the AME server 102 via, for example, the Internet and/or a local network.

While an example manner of implementing the social message tracker 200 is illustrated in FIG. 2, one or more of the elements, processes and/or devices illustrated in FIG. 2 may be combined, divided, re-arranged, omitted, eliminated and/or implemented in any other way. Further, the example external interface 202, the example URL analyzer 204, the example media provider 206, the example impression logger 208, the example storage device 210, the example message queue 212, the example handle analyzer 214 and/or, more generally, the example social message tracker 200 of FIG. 2 may be implemented by hardware, software, firmware and/or any combination of hardware, software and/or firmware. Thus, for example, any of the example external interface 202, the example URL analyzer 204, the example media provider 206, the example impression logger 208, the example storage device 210, the example message queue 212, the example handle analyzer 214 and/or, more generally, the example social message tracker 200 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example external interface 202, the example URL analyzer 204, the example media provider 206, the example impression logger 208, the example storage device 210, the example message queue 212 and/or the example handle analyzer 214 are hereby expressly defined to include a tangible computer readable storage device or storage disk such as a memory, DVD, CD, Blu-ray, etc. storing the software and/or firmware. Further still, the example social message tracker 200 of FIG. 2 may include one or more elements, processes and/or devices in addition to, or instead of, those illustrated in FIG. 2, and/or may include more than one of any or all of the illustrated elements, processes and devices.

In the illustrated example, the social message tracker 200 is provided with the external interface 202 to exchange communications with client devices (e.g., the client device 106 of FIG. 1). For example, the external interface 202 receives the media request 120 (FIG. 1) from the example client device 106 (FIG. 1), and provides the media request 120 to the URL analyzer 204. In some examples, the external interface 202 may perform additional processing to provide information to the URL analyzer 204. For example, the media request 120 received by the external interface 202 may be encoded using a different protocol (e.g., HTTP, simple object access protocol (SOAP), etc.) than what the URL analyzer 204 is configured to process. In some such examples, the external interface 202 decodes or translates the received media request 120 before providing the media request 120 to the URL analyzer 204. In the illustrated example, the example external interface 202 is also provided to send the requested media (e.g., the image 112 of FIG. 1) to the requesting device (e.g., the example client device 106) when the media is identified by the URL analyzer 204 as described below.

In the illustrated example, the URL analyzer 204 analyzes the URL 118 (FIG. 1) in the media request 120 (FIG. 1) received from the external interface 202. Using the URL 118, the URL analyzer 204 determines that the media request 120 corresponds to a particular sponsored social media message (e.g., message 114a, 122a). The example URL analyzer 204 also determines the message sender that corresponds to the social media message. In some examples, the URL analyzer 204 may use a lookup table to determine the social media message (e.g., message 114a, 122a) and the message sender to which the media request 120 corresponds. However, other methods to determine that the received media request 120 arises from an impression of a specific sponsored social media message (e.g., message 114a, 122a) at a user device (e.g., the client device 106) may additionally or alternatively be used. In illustrated examples disclosed herein, the URL analyzer 204 also uses the URL 118 to determine which media (e.g., the image 112 of FIG. 1) is being requested by the media request 120. In other examples, the media request 120 may include other information (e.g., one or more image identifiers, one or more image filenames, etc.) specifying the media (e.g., the image 112) being requested by the media request 120. An example lookup table data structure that may be used by the URL analyzer 204 to identify the requested image 112 is described below in connection with FIG. 3. In some examples, the URL analyzer 204 includes an example message queue 212 to store the message requests as they are received from the example external interface 202. In some examples, the URL analyzer 204 analyzes the message requests stored in the message queue 212 in the same order received from the external interface 202 (e.g., first-in, first-out).

To provide media (e.g., image files, visual images, audio, text, etc.) in response to requests from client devices, the example social message tracker 200 is provided with the media provider 206. In the illustrated example, the media provider 206 receives a media identifier from the example URL analyzer 204 and/or analyzes information in the media request 120 specifying media (e.g., the image 112) being requested. The example media provider 206 uses the media identifier and/or other information (e.g., an image identifier, an image filename, etc.) from the media request 120 to locate the requested media in a media database (e.g., stored in the example storage device 210). In some examples, the storage device 210 is separate from but local to the example social message tracker 200 (e.g., in communication with the media provider 206 via local interfaces such as Universal Serial Bus (USB), FireWire, Small Computer System Interface (SCSI), etc.). In other examples, the storage device 210 is located at an off-site location and communicates with the media provider 206 over long distances via, for example, Ethernet, internet Small Computer System Interface (iSCSI), optical and/or fiber channels, etc. In some examples, the requested media may be hosted on a third-party server or network. For example, the requested media may be hosted on a content delivery network. The example media provider 206 then provides the requested media to the example external interface 202.

In the illustrated example of FIG. 2, the handle analyzer 214 determines whether to credit an impression to a social media message as an earned media impression or an unearned media impression based on the media request 120 from the external interface 202 and information from the URL analyzer 204. For example, the URL analyzer 204 may send a message to the handle analyzer 214 indicating the message sender (e.g., celebrity) corresponding to the social media message. In the illustrated example, the handle analyzer 214 compares the user identifier 124 from the media request 120 to a list of followers 228 (e.g., the Celebrity_D followers list 505 of FIG. 5) of the message sender (e.g., celebrity). In the illustrated examples, lists of followers are lists of subscribers that subscribe to receive messages from a particular sender. Such subscribers are sometimes referred to as followers in the Twitter® social messaging service. Although examples disclosed herein are described in connection with lists of followers, disclosed examples may additionally or alternatively be implemented using other types of message subscribers. Another example of message subscribers is an email subscriber list or an email recipient list of persons that subscribe to receiving email messages from particular original senders of emails directed to subscribers of email subscriber lists.

In the illustrated example, the list of followers 228 of the sponsored message sender is a list of user identifiers (e.g., including the user identifier 124 of FIG. 1) of original intended recipients of messages sent by the message sender. In the illustrated example, the list of followers 228 (or list of user identifiers) is stored in a lookup table in the storage device 210. However, other methods to determine whether the media request 120 corresponds to an original social media message or a forwarded social media message may additionally or alternatively be used.

In the illustrated example, the impression logger 208 credits (or logs) impressions to social media messages based on indications received from the URL analyzer 204 and the handle analyzer 214. For example, the URL analyzer 204 may send a message to the impression logger 208 instructing the impression logger 208 to increment a specific counter 208a, 208b, or 208n of a corresponding identified social media message. The message may reference the counter to be incremented in any desired (or suitable) fashion (e.g., by sending an address of the counter). Alternatively, the URL analyzer 204 may simply list the corresponding URL in a data structure or it may tabulate all the URLs in a single data structure with corresponding memory addresses of the counters to be incremented for each URL. In some examples, the impression logger 208 appends and/or prepends additional information to logged impression entries while crediting social media messages. In some examples, the impression logger 208 stores a message identifier 222 (e.g., a message ID) with the logged impression entries to identify the example social media message. In some examples, the impression logger 208 stores a timestamp 216 with the logged impression entries indicating the dates and/or times the example social message tracker 200 received requests for corresponding media. In some examples, the impression logger 208 stores a campaign identifier 218 (e.g., a campaign ID) with the logged impression entries identifying advertising campaigns of corresponding social media messages. In some examples, the impression logger 208 stores a forwarded message identifier 224 (e.g., a forwarded ID) with the logged impression entries indicating whether the impression corresponds to an expected media impression or an unexpected media impression. For example, the impression logger 208 may append an indication from the handle analyzer 214. For example, the forwarded message identifier 224 may be represented by a bit or a flag. In some examples, the impression logger 208 stores a user identifier 226 with the logged impression entries to store user identifiers (e.g., the user identifier 124 of FIG. 1) of message recipients, regardless of whether the recipients are original intended recipients (e.g., followers of the original sender) or recipients that received messages as forwarded messages. In some examples, the impression logger 208 periodically and/or aperiodically communicates the aggregate impression counts for each social media message to a corresponding sponsor. Thus, the sponsor may use the aggregate impression counts to track total impressions and/or frequency of impressions for each sponsored social media message.

In some examples, information regarding the user is collected from the requesting client device (e.g., the example client device 106 of FIG. 1) via, for example, media requests (e.g., the media request 120 of FIG. 1). In some examples, this information is used to develop demographic (or census) information regarding the users of client devices requesting the sponsored social media messages. For example, when a client device requests media from the AME server 102, the client device includes a device identifier 220 such as an IP address in the media request so that the requested media is served back to the requesting client device. For devices with static public IP addresses, the IP address can be used to retrieve demographic information in examples in which such users have previously provided such demographic information. For example, users may agree to participate in market research panels or audience member panels, and provide demographic information that the AME stores in association with public IP addresses of those users. In some instances, a mobile device such as the example client device 106 changes IP addresses several times throughout the day. As a result, the IP address may not be used, in such instances, to identify the exact user. However, the IP address can be used to identify general geographic locations of the user. Thus, an analysis of the logged impressions may indicate that certain social media messages are more effective in reaching more people in certain parts of the country than in others. In addition, the logged impressions may indicate that users of client devices in certain cities are more responsive to social media messages conveyed by some messages senders and not others. In some examples, the device identifier 220 may additionally or alternatively identify what kind of a device is requesting the media. Other demographic information regarding the client device or the user may also be gathered using any other suitable information included in a message request.

In some examples, a client device may include a full-capabilities web browser. Such web browsers enable cookies (e.g., HTTP cookies, web cookies, browser cookies, etc.) to be downloaded by the client device. These cookies may then gather information about the user as the user continues to browse the Internet via the web browser. For example, a cookie may be used to store information regarding which web pages were accessed, how often these pages were accessed, whether the user engages is a login process or is still logged in, etc. In some examples, the cookies are periodically or aperiodically transmitted to the AME server 102. In some examples, the AME server 102 may map the cookies to demographic information of the user and/or other information identifying the user. For example, the cookies may be mapped to census information including the demographics of the users.

In some examples, the requested media may be hosted by a third-party. For example, the requested media file may be hosted on a content delivery network. In such a network, media files are distributed amongst several local nodes connected by the content delivery network. In some such examples, the AME server 102 periodically or aperiodically retrieves impressions logs from the content delivery network.

FIG. 3 illustrates an example data structure 300 that maps URLs, social media messages and media. In the illustrated example, each URL corresponds to a different, respective social media message. For example, an example URL (URL_X) 118 (e.g., the example URL 118 of FIG. 1) corresponds to an example message (Message_X) 114a (e.g., the example message 114a, 114b of FIG. 1), an example URL (URL_Y) 304 corresponds to an example message (Message_Y) 316, etc. However, in the illustrated example, multiple URLs in the data structure 300 correspond to a same media (e.g., a same image file, a same audio file, a same visual image file, etc.). For example, an example image (Image_1) 112 (e.g., the example image 112 of FIG. 1) corresponds to all of the URL (URL_X) 118, the URL (URL_Y) 304 and an example URL (URL_Z) 306. In the illustrated example, an example URL (URL_Q) 308, an example URL (URL_R) 310, and an example URL (URL_S) 312 correspond to an example image (Image_2) 328. However, each of the URLs 308, 310 and 312 corresponds to a different social media message (e.g., an example message (Message_Q) 320, an example message (Message_R) 322 or an example message (Message_S) 324). In the illustrated example, an example URL (URL_L) 330, an example URL (URL_M) 332, and example URL (URL_N) 334 correspond to an example audio file denoted as Audio_1 342. However, each of the URLs 330, 332 and 334 corresponds to a different social media message (e.g., an example message (Message_L) 336, an example message (Message_M) 338 or an example message (Message_N) 340). In the illustrated example, the URL analyzer 204 (FIG. 2) uses the URL 118 for a received media request (e.g., the media request 120 of FIG. 1) to inform the example media provider 206 (FIG. 2) of the corresponding image 112. In addition, the URL analyzer 204 informs the example impression logger 208 (FIG. 2) of the sponsored social media message 114a to credit with an impression based on the message 114a being associated with the URL 118 in the data structure 300.

In some examples, copies of the sponsored media may be stored in the example data storage 210, and each copy of the sponsored media corresponds to a different filename. For example, an example video file (Video_1) 360, an example video file (Video_2) 362 and an example video file (Video_3) 364 may all correspond to the same video file (e.g., they may all be copies of the same video file), but be stored in the example storage device 210 with different filenames. In other examples, each of the videos 360, 362 and 364 may correspond to different video files. For example, the video (Video_1) 360 may be a video of an example sender (Celebrity_G) 366 drinking a sponsor's beverage and the video (Video_2) 362 and video (Video_3) 364 may be two different videos of an example sender (Celebrity_H) 368 drinking the sponsor's beverage. Any suitable URL format may be used to distinguish the URLs from one another when used by a client device to request media. For example, the URLs 118, 304, 306, 308, 310, 312, 330, 332, 334, 348, 350, 352 may be stored in the data structure 300 as short URLs (e.g., http://a.me/vid1.mov) or any other URL format (e.g., http://www.amesite.com/vid1.mov). Storing the URLs as short URLs may be beneficial in minimizing the storage space used in the example data structure 300. In some examples, different media filenames in the URLs may be used to distinguish between different corresponding media messages. For example, a URL "http://www.amesite.com/vid-1.mov" may be used for the URL (URL_O) 348 corresponding to the message (Message_T) 354, a URL "http://www.amesite.com/vid-2.mov" may be used for the URL (URL_P) 350 corresponding to the message (Message_U) 356, and a URL "http://www.amesite.com/vid-3.mov" may be used for the URL (URL_Q) 352 corresponding to the message (Message_W) 358. In such examples, the vid-1.mov filename corresponds to the video file (Video_1) 360, the vid-2.mov filename corresponds to the video file (Video_2) 362, and the vid-3.mov filename corresponds to the video file (Video_3) 364. In some examples, the video files 360, 362, 364 may be copies of the same video. Alternatively, the video files 360, 362, 364 may be different videos. Other sponsored media and media filename combinations may additionally or alternatively be used.

In the illustrated example of FIG. 3, each URL corresponds to one or more message senders (A, B, C, D, E, F, G, and H). For example, the URL (URL_X) 118, the URL (URL_Y) 304 and the URL (URL_Z) 306 each correspond to an example sender (Celebrity_D) 504, the URL (URL_Q) corresponds to an example sender (Celebrity_A) 404, the URL (URL_L) 330 and the URL (URL_M) 332 correspond to an example sender (Person_E) 344, etc. In some examples, the URL analyzer 204 may send a message to the impression logger 208 instructing the impression logger 208 to increment a counter corresponding to a specific message sender. The message may reference the counter to be incremented in any desired (or suitable) fashion. In some examples, the counter may indicate cumulative impressions credited to social media messages corresponding to a message sender. For example, the URL analyzer 204 uses any of the URL (URL_X) 118, the URL (URL_Y) 304 and/or the URL (URL_Z) 306 from a received media request (e.g., the media request 120 of FIG. 1) to inform the example impression logger 208 to increment a counter corresponding to the sender (Celebrity_D) 504.

Figure 8:
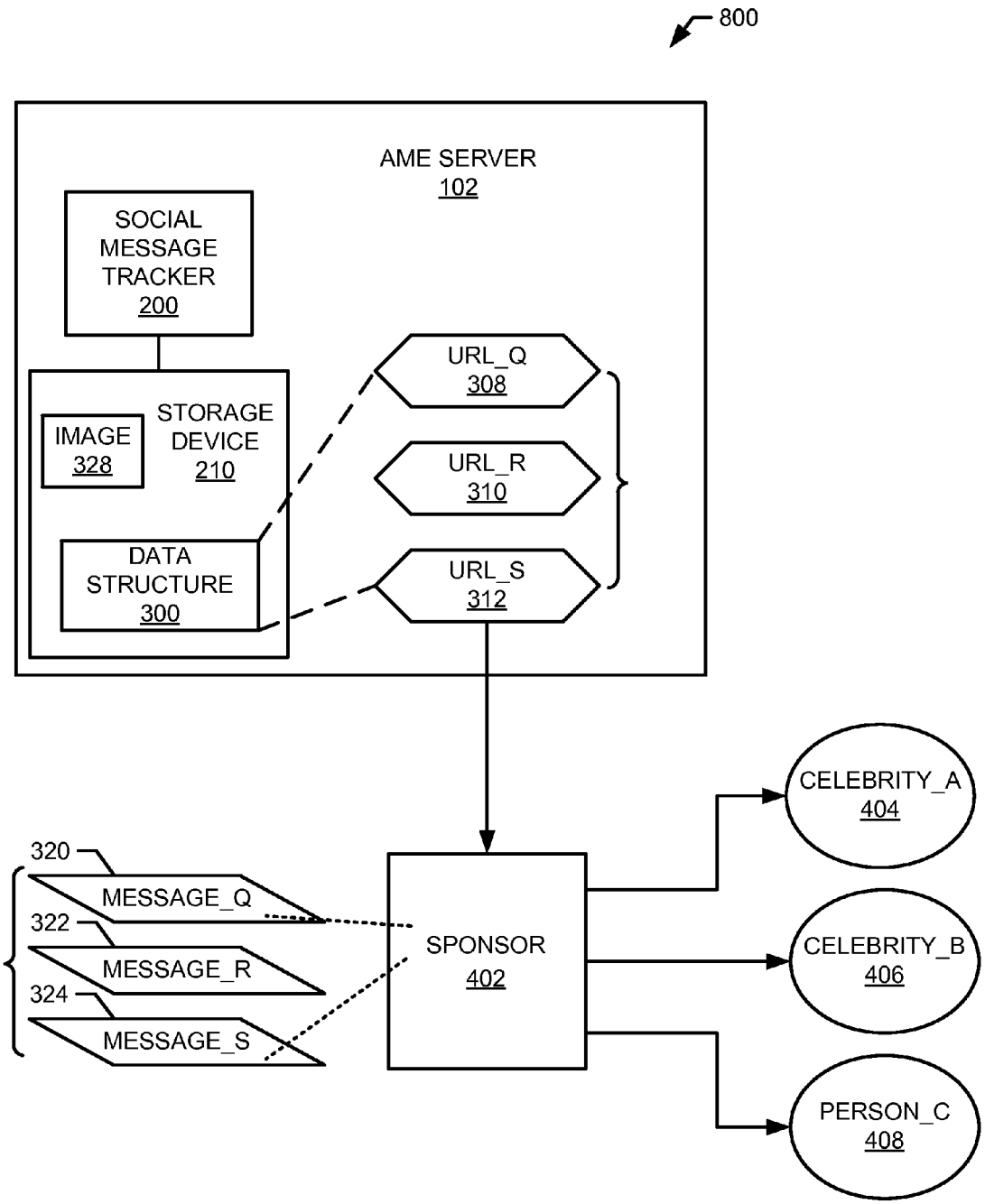
FIG. 8 is an example communication flow diagram illustrating monitoring of impressions of social media messages in the example environment of FIG. 1.

FIG. 8 is an example communication flow diagram to monitor impressions of social media messages in the example environment 100 of FIG. 1. In the illustrated example, the example AME server 102 provides URLs 308, 310 and 312 to an example sponsor 402 for assigning to social media messages. For example, the AME server 102 provides the sponsor 402 the example URL (URL_Q) 308 to include in the example social media message (Message_Q) 320, the example URL (URL_R) 310 to include in the example social media message (Message_R) 322, and the example URL (URL_S) 312 to include in the example social media message (Message_S) 324. In the illustrated example, the example sponsor 402 is a party that enters into agreement(s) with one or more message senders (e.g., celebrities or other well-known individuals, personalities, or entities, real or fictitious) to send social media messages (e.g., the social media messages 320, 322, 324) promoting or endorsing the sponsor, or products or services of the sponsor. In this manner, the example sponsor 402 hopes to increase exposure to or awareness for a sponsor, a product and/or a service when a contracted sender sends a sponsored social media message.

In the illustrated example, the AME server 102 generates a URL that is later encoded in a social media message generated by the sponsor 402 and/or the senders 404, 406, 408. Based on the preferences of the example sponsor 402, the example AME server 102 generates a URL that achieves the goals of the sponsor 402. The AME server 102 generates URLs identifying corresponding media provided by the AME server 102, and that uniquely identify corresponding social media messages. In the illustrated example, the sponsor 402 identifies the three example social media messages Q 320, R 322 and S 324 to track. According to the preferences of the sponsor 402, each of the social media messages (Q 320, R 322 and S 324) when rendered, is to include externally located media (e.g., the example image (Image_2) 328 of FIG. 3). Thus, the example AME server 102 generates the example URL (URL_Q) 308, the example URL (URL_R) 310 and the example URL (URL_S) 312, each of which corresponds to the example image (Image_2) 238. Additionally, each of the generated URLs Q 308, R 310 and S 312 corresponds to a different social media message. In the illustrated example, the URL (URL_Q) 308 corresponds to the example message (Message_Q) 320, the example URL (URL_R) 310 corresponds to the example message (Message_R) 322, and the example URL (URL_S) 312 corresponds to the example message (Message_S) 324.

The generated URLs Q 308, R 310 and S 312 are then stored in a lookup table, such as the example data structure 300, and used by the example social message tracker 200 when crediting a social media message with an impression. In the illustrated example, the data structure 300 is stored in the example storage device 210 of FIG. 2.

In the illustrated example, the AME server 102 provides the generated URLs (Q 308, R 310 and S 312) to the example sponsor 402 for locating in the corresponding social media messages (Q 320, R 322 and S 324). In the illustrated example of FIG. 8, the sponsor 402 contracts with three different message senders including the example sender (Celebrity_A) 404, the example sender (Celebrity_B) 406 and the example sender (Person_C) 408 shown in the example data structure 300 of FIG. 3. In addition, the sponsor 402 provides each message sender 404, 406, 408 with a different sponsored social media message (e.g., one of the messages 320, 322, 324) including a corresponding URL (e.g., a corresponding one of the URLs 308, 310, 312) to externally located media. For example, the sponsor 402 embeds the URL (URL_Q) 308 into the social media message (Message_Q) 320 and provides the sponsored message (Message_Q) 320 to the sender (Celebrity_A) 404.

In some examples, the AME server 102 generates the messages Q 320, R 322, S 324 and embeds the URLs 308, 310, 312 into corresponding ones of the social media messages 320, 322, 324 and then provides the social media messages 320, 322, 324 including the URLs 308, 310, 312 to the sponsor 402. In other examples, the sponsor 402 provides corresponding ones of the URLs 308, 310, 312 to corresponding ones of the senders 404, 406, 408, and each of the senders 404, 406, 408 generates a corresponding one of the messages 320, 322, 324 and locates its URL 308, 310, 312 in the message 320, 322, 324. In other examples, the AME server 102 may provide the URLs 308, 310, 312 and/or the social media messages 320, 322, 324 to a third-party to further distribute or to convey the sponsored social media messages to other senders.

Figure 4:
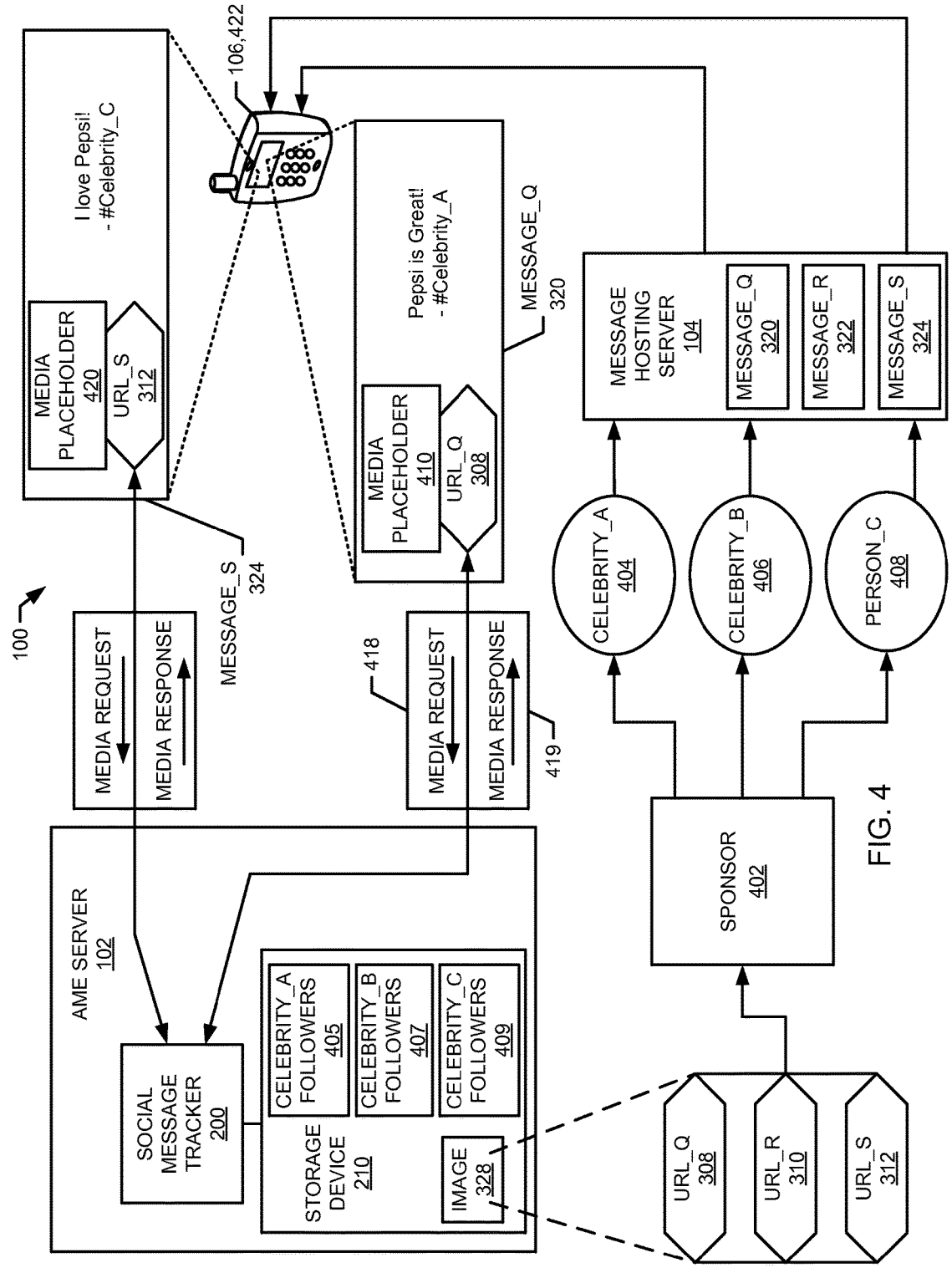
FIG. 4 is an example communication flow diagram illustrating monitoring of impressions of social media messages in the example environment of FIG. 1.

FIG. 4 is an example communication flow diagram to monitor impressions of social media messages in the example environment 100 of FIG. 1. In the illustrated example of FIG. 4, the sponsor 402 contracts with three different message senders including the example sender (Celebrity_A) 404, the example sender (Celebrity_B) 406 and the example sender (Person_C) 408 shown in the data structure 300 of FIG. 3. In addition, the sponsor 402 provides each message sender 404, 406 and 408 with a different sponsored social media message. For example, the sponsor 402 provides the sender (Celebrity_A) 404 with an example sponsored social media message (Message_Q) 320, and provides the sender (Person_C) 408 with an example sponsored social media message (Message_S) 324 as shown in FIG. 4 and in the data structure 300 of FIG. 3.

In the illustrated example, each social media message 320, 322 and 324 is to be presented with a same image 328. In addition to or instead of an image, social media messages may be presented with other media (e.g., text, audio, video, etc.). Using the same media 328 as shown in the illustrated examples of FIGS. 3 and 4, the sponsor 402 can maintain brand recognition across the different sponsored social media messages 320, 322 and 324. For example, the image (Image_2) 328 may be an emblem or logo that identifies the sponsor 402 and/or products or services offered by the sponsor 402. In the illustrated example, the sponsor 402 desires to monitor impressions for the sponsored social media messages 320, 322 and 324. In this manner, the sponsor 402 may use the tracked impressions to determine, for example, which message senders and/or which messages are more influential in promoting products or services. Additionally, impression counts may be useful in identifying the effectiveness of certain advertising campaigns (e.g., by calculating the number of impressions per dollar spent).

In the illustrated example, when a message sender (e.g., the example sender (Celebrity_A) 404, the example sender (Celebrity_B) 406 and/or the example sender (Person_C) 408) sends a social media message (e.g., the messages 320, 322 and/or 324), the example message hosting server 104 receives, stores and distributes the social media message (e.g., to followers or subscribers of the senders 404, 406, 408).

In the illustrated example, the example client device 106 renders social media messages received from the message hosting server 104 to display or present to a user. The social media messages monitored in the illustrated examples (e.g., social media messages being monitored by the example AME server 102) include links to externally located media 328 (e.g., externally stored media referenced by a URL embedded in the message). In the illustrated examples, the media 328 is retrieved by the client device 106 and embedded into the social media message when the social media message is rendered at the client device 106. Some social media messages may additionally include embedded media (e.g., images, text, audio, video, etc.) that is included in the message sent by the message hosting server 104. In the illustrated example, a sponsored social media message received by the client device 106 includes a media placeholder having a URL corresponding to externally linked media. For example, the sponsored social media message (Message_Q) 320 includes an example media placeholder 410 including an example URL (URL_Q) 308 corresponding to the example image (Image_2) 328. In the illustrated example, the client device 106 requests and receives the image (Image_2) 328 by sending an example media request 418 to a server URL specified by the URL (URLQ) 308. In the illustrated example, the image (Image_2) 328 is stored at the AME server 102 and the URL (URL_Q) 308 directs the media request 418 to the AME server 102. In the illustrated example, the media request 418 also includes a user identifier 422, which identifies the user requesting the media.

In the illustrated example, the AME server 102 includes the example social message tracker 200 of FIG. 2 to monitor impressions of social media messages. In the illustrated example of FIG. 4, the example external interface 202 of FIG. 2 receives the media requests for the image 328. In the illustrated example, the social message tracker 200 analyzes the URL (URL_Q) 308 using a data structure, such as the example data structure 300 of FIG. 3, to find a corresponding image and a corresponding social media message. For example, when the example URL analyzer 204 of the social message tracker 200 receives a media request addressed to the example URL (URL_Q) 308, the URL analyzer 204 informs the example media provider 206 of the corresponding image (Image_2) 328. In the illustrated example, the media provider 206 locates the example image (Image_2) 328 and retrieves the example image (Image_2) 328 from a media database such as the storage device 210 of FIGS. 2 and/or 4. In some examples, the media provider 206 and/or the storage device 210 may not be included in the social message tracker 200 and/or the AME server 102 of FIG. 4. In the illustrated example, the example social message tracker 200 sends the example image (Image_2) 328 to the requesting device 106 via the external interface 202 in a media response 419.

The example social message tracker 200 of the illustrated example also uses the example data structure 300 of FIG. 3 to determine which social media message to credit with an impression based on the received URL. In the illustrated example, the impression logger 208 of FIG. 2 credits the example message (Message_Q) 320 with an impression based on an indication of the URL (URL_Q) 308 received from the URL analyzer 204 by, for example, incrementing a corresponding counter (e.g., one of the counters 208 of FIG. 2). Using a similar process, the example impression logger 208 credits the message (Message_S) 324 with an impression based on an indication of the URL (URL_S) 312 received from the URL analyzer 204. In this manner, two different URLs (e.g., the example URL (URL_Q) 308 and the example URL (URL_S) 312) map to the same media (e.g., the example image (Image_2) 328), but still contribute to crediting two different social media messages (e.g., the example social media message (Message_Q) 320 and the example social media message (Message_S) 324) with an impression.

The example social message tracker 200 of the illustrated example also uses the user identifier 422 to determine whether the impression is an expected (e.g., unearned) media impression or an unexpected (e.g., earned) media impression. In the illustrated example, the impression logger 208 of FIG. 2 stores a forwarded ID 224 (FIG. 2) with the entry for the impression based on the handle analyzer 214 (FIG. 2) determining that the corresponding social media message was forwarded. For example, the handle analyzer 214 compares the user identifier 422 included in the media request 418 to a list of followers of the sender (Celebrity_A) 440 stored in, for example, a Celebrity_A followers data structure 405 (e.g., an intended recipients data structure) stored in the storage device 210. Using a similar process, the example impression logger 208 stores a forwarded ID 224 in the entry for the logged impression to indicate the social media message 324 as an expected media impression or an unexpected media impression based on whether the handle analyzer 214 determines that the corresponding social media message was forwarded.

Figure 5:
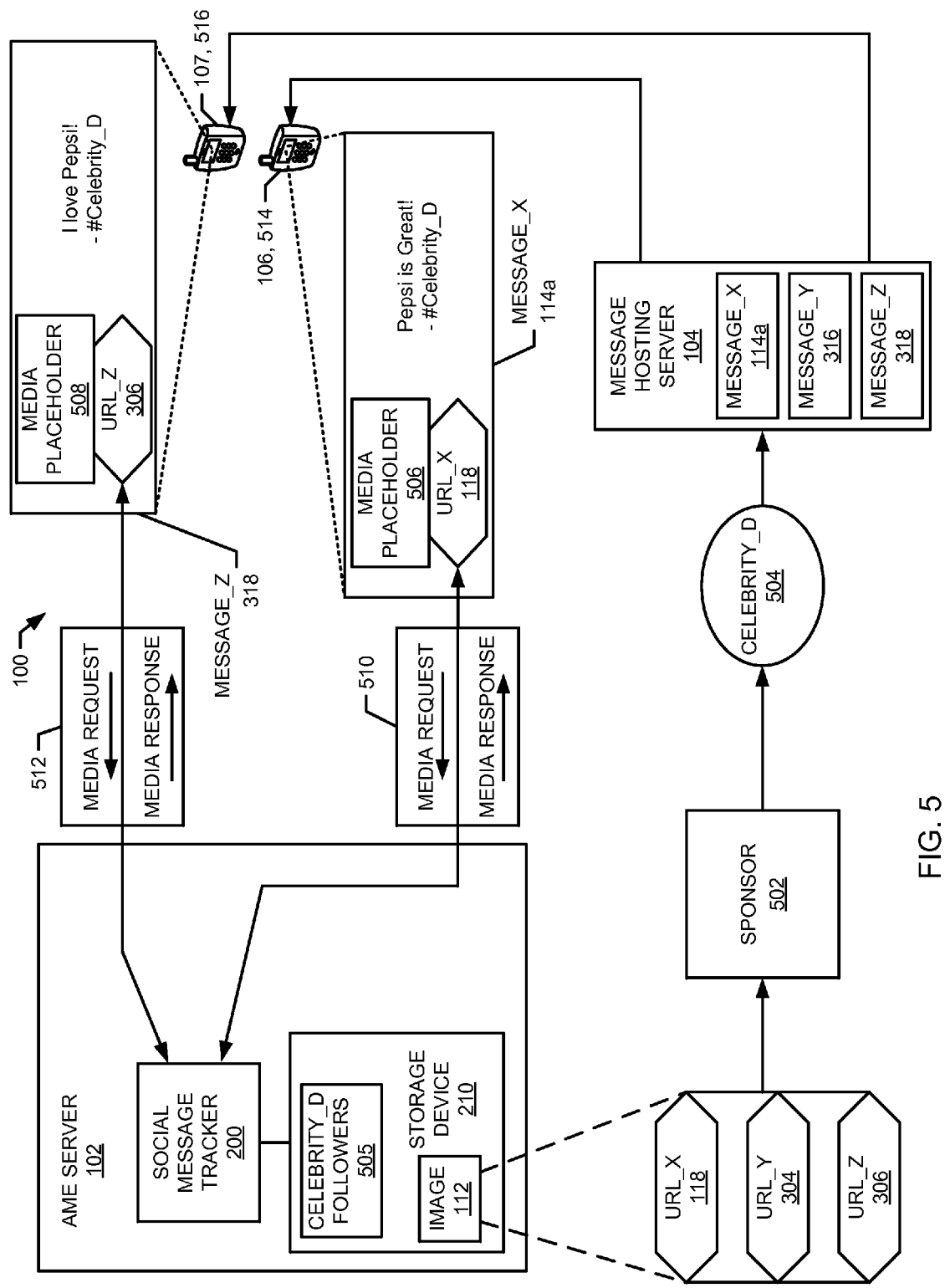
FIG. 5 is another example communication flow diagram illustrating monitoring of impressions of social media messages in the example environment of FIG. 1.

FIG. 5 is another example communication flow diagram to monitor impressions of social media messages in the example environment 100 of FIG. 1. In the illustrated example, an example sponsor 502 enters into an agreement with a message sender to send social media messages. In the illustrated example, the message sender provides the AME server 102 a list of user identifiers (e.g., the list of followers 228 of FIG. 2) identifying users that follow the message sender. In some examples, the AME server 102 receives the list of user identifiers from the message hosting server 104. In some examples, the AME server 102 receives the list of user identifiers from a third-party server hosting the list of user identifiers. In the illustrated example of FIG. 5, the sponsor 502 contracts with a message sender (e.g., an example sender (Celebrity_D) 504 shown in FIG. 5 and in the data structure 300 of FIG. 3) to send three different social media messages (e.g., the example message (Message_X) 114a, the example message (Message_Y) 316 and the example message (Message_Z) 318). Each of the social media messages 114a, 316 and 318 includes a text portion and externally accessible linked media. For example, the message (Message_X) 114a includes an automatically activatable link to the image (Image_1) 112. Also pursuant to the agreement in the illustrated example, the list of users that follow the example message sender (Celebrity_D) 504 is provided to the AME server 102. In the illustrated example, the list of user identifiers is stored as an example Celebrity_D followers list 505 in the storage device 210. In the illustrated example, the example sender (Celebrity_D) 504 sends the example message (Message_X) 114a, the example message (Message_Y) 316 and the example message (Message_Z) 318, which are received, stored/hosted and distributed by the example message hosting server 104.

In the illustrated example, the social media messages 114a and 318 are sent from the message hosting server 104 to example client devices 106 and 107 without the image (Image_1) 112, but instead include an automatically activatable link to the image 112. In the illustrated example, the example message hosting server 104 sends to the client device 106 the example message (Message_X) 114a including an example media placeholder 506 (including the example URL (URL_X) 118), and sends to the example client device 107 the example message (Message_Z) 318 including an example media placeholder 508 (including the example URL (URL_Z) 306).

In response to accessing the message (Message_X) 114a, the client device 106 sends an example media request 510 addressed to the example URL (URL_X) 118 and including a user identifier (e.g., a user identifier 514) of the user of the client device 106, which directs the request 510 to the example AME server 102 to request the image (Image_1) 112. In a similar manner, in response to accessing the message (Message_Z) 318, the client device 107 sends an example media request 512 addressed to the example URL (URL_Z) 306 and including an example user identifier 516 of the user of the client device 107, which directs the media request 512 to the example AME server 102 requesting the same image (Image_1) 112.

In the illustrated example, the external interface 202 of FIG. 2 receives media requests from client devices requesting media to be presented with social media messages. In the illustrated example, the social message tracker 200 identifies images and social media messages corresponding to the URLs to which media requests are addressed. For example, the social message tracker 200 may use the example data structure 300 of FIG. 3 to determine a requested image and a social media message corresponding to a URL to which a received media request was addressed. For example, the social message tracker 200 looks up the corresponding social media message (Message_X) 114a for the URL (URL_X) 118, and looks up the corresponding social media message (Message_Z) 318 for the URL (URL_Z) 306. As a result, the social message tracker 200 credits the messages 114a and 318 with corresponding impressions by, for example, incrementing a corresponding counter (e.g., one of the counters 208 of FIG. 2). In this manner, the AME server 102 collects impressions of social media messages. In the illustrated example, the social message tracker 200 also stores a forwarded ID 224 in the entry for the impression to the social media message to indicate that the impression is an expected media impression or an unexpected media impression as determined by the handle analyzer 214 of FIG. 2.

In the illustrated example, after determining that the media request 510 is requesting the image 112 based on being addressed to the URL 118, the social message tracker 200 sends the requested image (Image_1) 112 to the example client device 106 to render the social media message (Message_X) 114. Similarly, the social message tracker 200 selects the image 112 for the client device 107 based on the media request 512 being addressed to the URL (URL_Z) 306, and sends the image 112 to the example client device 107 to render the social media message (Message_Z) 318.

Figure 6:
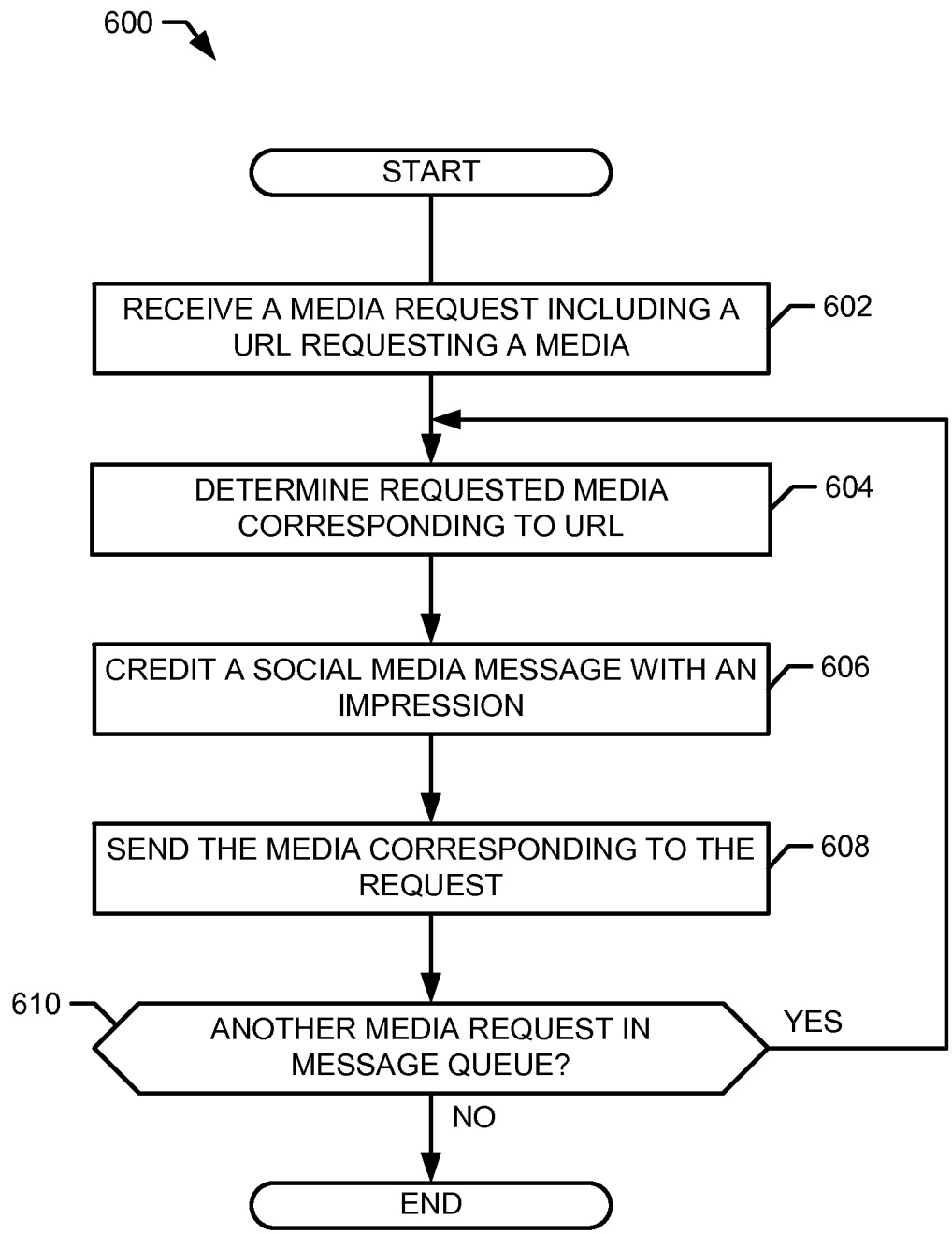
FIG. 6 is a flowchart representative of example machine readable instructions that may be executed to log an impression for a social media message.
Figure 7:
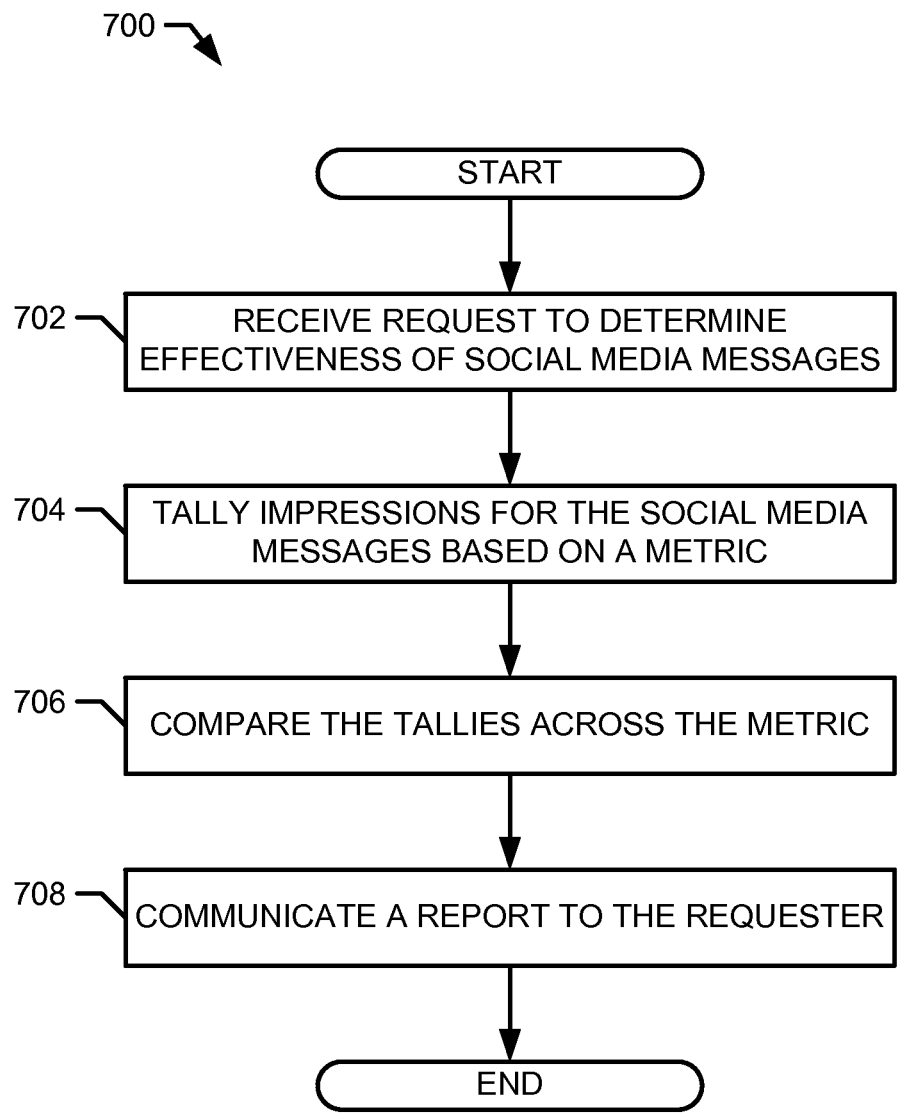
FIG. 7 is a flowchart representative of example machine readable instructions that may be executed to determine an effectiveness of a media campaign.
Figure 10:
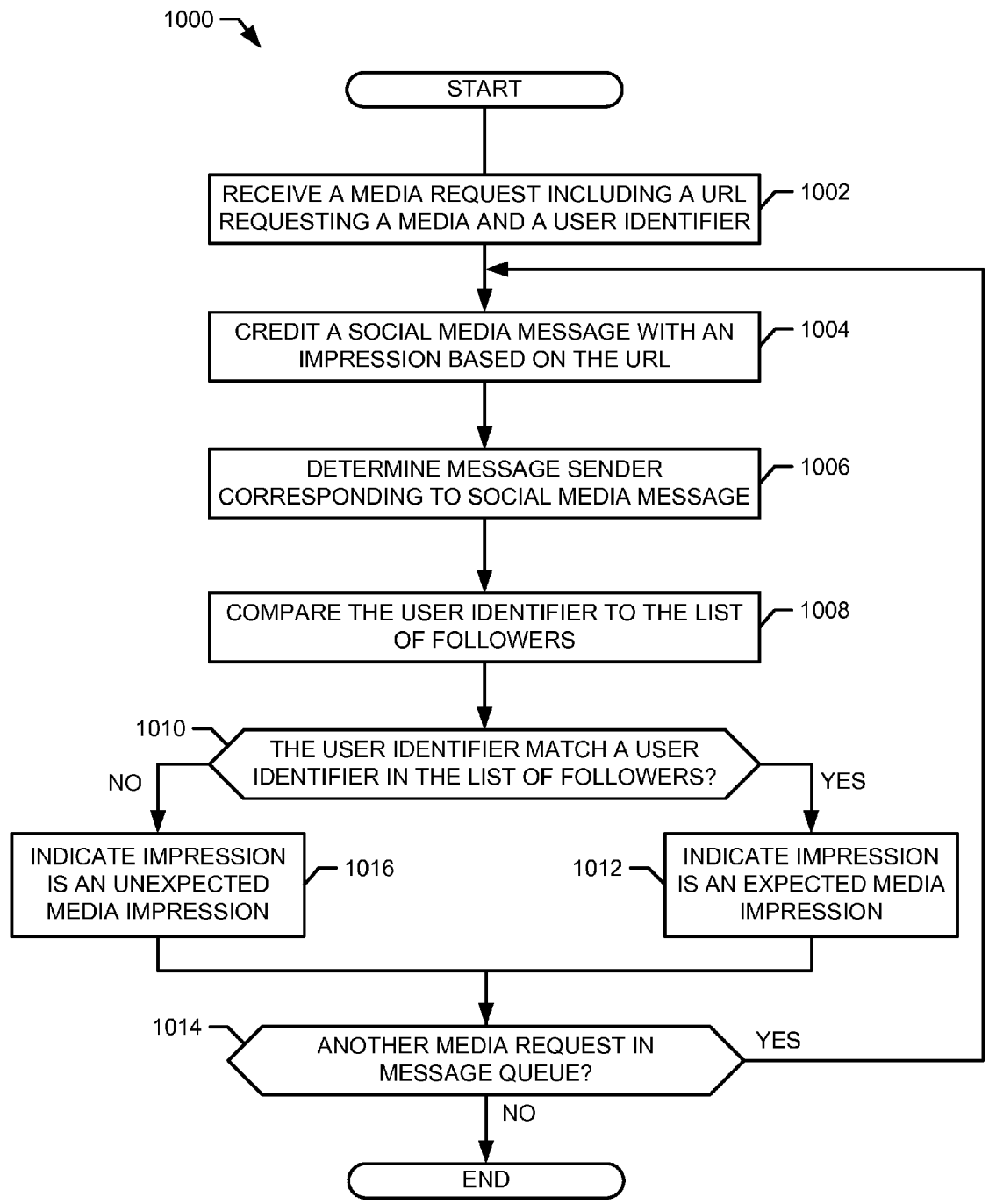
FIG. 10 is a flowchart representative of example machine readable instructions that may be executed to log an earned media impression for a social media message.

Flowchart representative of example machine readable instructions for implementing the social message tracker 200 of FIG. 2 are shown in FIGS. 6, 7 and 10. In this example, the machine readable instructions comprise programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 6, 7 and 10, many other methods of implementing the social message tracker 200 of FIG. 2 may alternatively be used. For example, the order of execution of the blocks may be changed, and/or some of the blocks described may be changed, eliminated, or combined.

As mentioned above, the example processes of FIGS. 6, 7 and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6, 7 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program of FIG. 6 begins at block 602 at which the example external interface 202 (FIG. 2) receives a media request. For example, the external interface 202 receives the example media request 120 (FIG. 1) (including the example URL 118) sent by the client device 106 (FIG. 1) to the example AME server 102 (FIG. 1) requesting the example image 112 (FIG. 1).

At block 604, the social message tracker 200 identifies the requested media. For example, the example URL analyzer 204 (FIG. 2) looks up the requested media based on the received URL 118 using the data structure 300 (FIG. 3), and forwards the media (e.g., the image 112 or an indication thereof) to the example media provider 206.

At block 606, the social message tracker 200 credits a social media message corresponding to the URL with an impression. For example, the example URL analyzer 204 identifies the example message 114a based on the URL 118 using the data structure 300, and informs the example impression logger 208 (FIG. 2) to credit the message 114a with an impression. In some examples, the impression logger 208 logs an entry when crediting (or logging) a social media message with an impression. In some such examples, the impression logger 208 may add additional information to the entry. For example, the impression logger 208 may include a timestamp, a device identifier included in the media request, and/or any other information that may provide additional information regarding the impression.

At block 608, the social message tracker 200 sends the requested media to the requesting device. For example, the media provider 206 receives the image 112 from the URL analyzer 204 or retrieves the image 112 from the example storage device 210, and the social message tracker 200 sends the image 112 to the client device 106 at block 608. At block 610, the social message tracker 200 determines whether there is another media request to process. For example, the example URL analyzer 204 determines whether there is another media request stored in the example message queue 212 (FIG. 2). If the example URL analyzer 204 determines there is another media request in the message queue 212, control returns to block 604. If the example URL analyzer 204 determines there is not another URL in the message queue, the example process 600 ends.

The program of FIG. 7 begins at block 702 at which the example AME server 102 (FIG. 1) receives a request to determine the effectiveness of a media campaign (e.g., a messaging campaign, an advertising campaign, a promotional campaign, etc.). For example, the example AME server 102 receives a request from the example sponsor 402 (FIG. 4) to determine the effectiveness of their media campaign including social media messages Q 320, R 322, S 324. In some examples, the request is received periodically, aperiodically and/or event-driven. Although not shown in FIG. 7, to track impressions of social media messages, the AME server 102 may use techniques disclosed herein to associate URLs with social media messages and media at the AME server 102.

At block 704, the example impression logger 208 (FIG. 2) tallies the number of impressions for the relevant social media messages (e.g., the example message (Message_Q) 320, the example message (Message_R) 322 and the example message (Message_S) 324). For example, the AME server 102 tallies impressions based on received media requests as disclosed herein. The impressions may be tallied in any desired (or suitable) fashion based on different metrics. For example, the example impression logger 208 tallies the number of impressions according to the different social media messages specified by the sponsor 402. In such examples, the example sponsor 402 compares the cumulative impression numbers for each social media message (Q 320, R 322, S 324) to determine the effectiveness of each of the social media message (block 706).

In some examples, at block 704, the example impression logger 208 tallies the number of impressions according to the forwarded ID 224 stored with the impression entries. In such examples, the effectiveness of the media campaign can be based on a comparison, at block 706, of the total number of expected media impressions (e.g., impressions having forwarded IDs 224 indicating they correspond to original intended recipients) versus the total number of unexpected media impressions (e.g., impressions having forwarded IDs 224 indicating they correspond to persons other than original intended recipients) for a social media message.

In some examples, at block 704, the example impression logger 208 tallies the number of impressions according to the different device identifiers (e.g., the device identifier 220 of FIG. 2). In such examples, the effectiveness of the media campaign can be based on a comparison, at block 706, of the total number of unique device identifiers for each social media message. In addition, the device identifiers may be used to determine whether a client device that requested the example message (Message_Q) 320 is more likely or less likely to request another social media message in the same media campaign.

In some examples, at block 704, the example impression logger 208 tallies the number of impressions according to timestamps (e.g., the timestamps 216 of FIG. 2) appended with the impressions data. In such examples, a comparison, at block 706, of the number of impressions for the social media messages during different timestamp ranges indicates the effectiveness of the different social media messages throughout the day. For example, certain social media messages may be requested during the early morning hours. Additionally or alternatively, social media messages conveyed by a certain message sender may generate more media requests during the early morning hours. Thus, it may be beneficial for a purveyor of goods or services that caters to early morning customers to form an agreement with the message sender.

In some examples, at block 704, the example impression logger 208 tallies the number of impressions according to a campaign ID (e.g., the campaign ID 218 of FIG. 2) or a URL (e.g., any of the URLs 118, 304, 306, 308, 310, 312, 330, 332, 334, 348, 350, 352 of FIG. 3). For example, the total number of impressions logged for the social media messages included in media campaign is tallied. In such examples, a comparison, at block 706, of the total numbers across previous media campaigns may be used to determine the effectiveness of certain media campaigns over others. For example, the effectiveness of a media campaign may be determined based on a comparison of the number of impressions logged from the media campaign divided by the amount of money (e.g., number of dollars) spent on the media campaign. This data may be further analyzed to determine, for example, which message senders were more effective relative to the amount of money paid to the message sender.

At block 708 of FIG. 7, the results are prepared in a report and communicated to the requesting sponsor. The example process 700 of FIG. 7 then ends.

Figure 9:
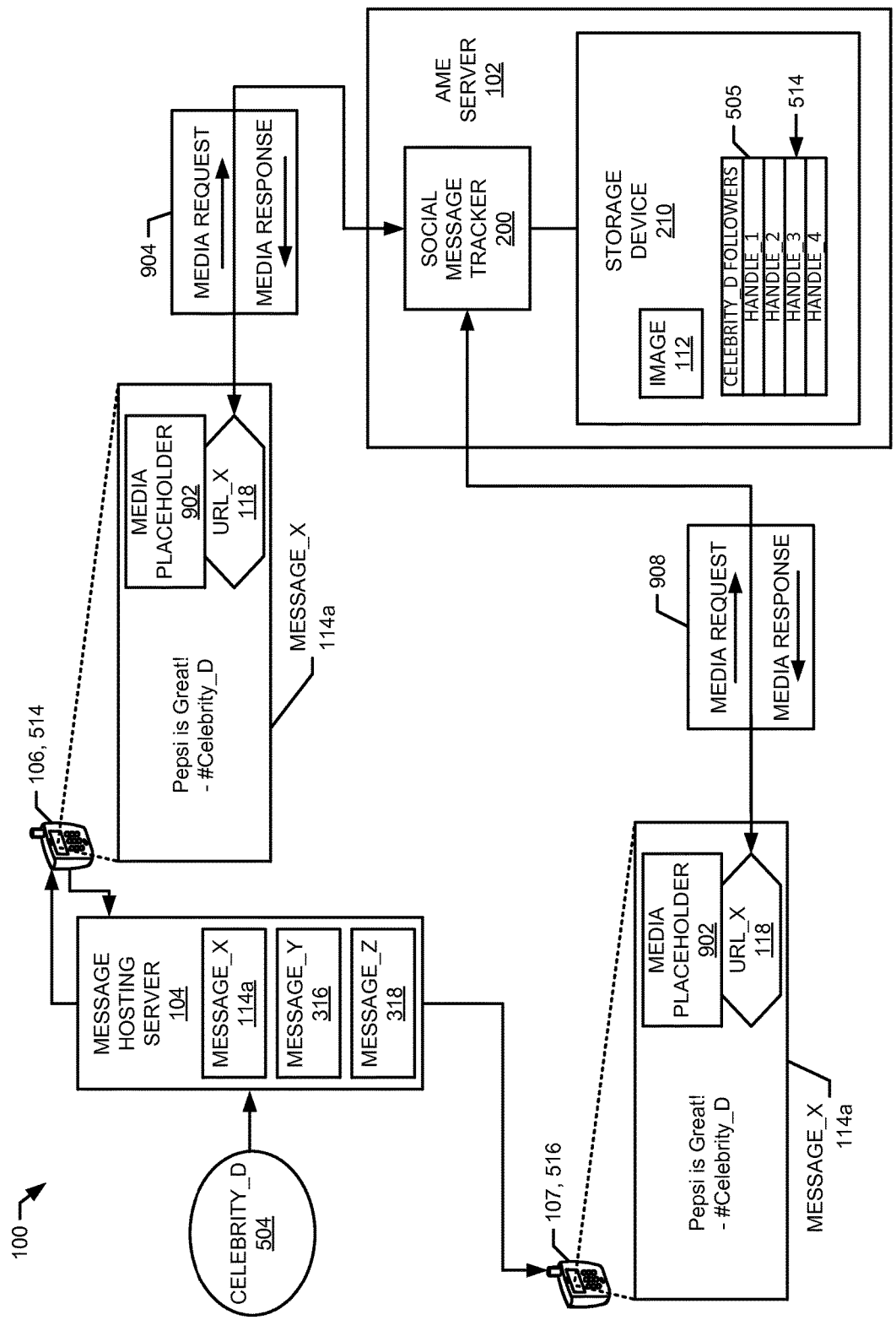
FIG. 9 is another example communication flow diagram illustrating monitoring of impressions of social media messages in the example environment of FIG. 1.

FIG. 9 is another example communication flow diagram to monitor impressions of social media messages in the example environment 100 of FIG. 1. Similar to the example illustrated in FIG. 5, a sponsor (e.g., the example sponsor 502 of FIG. 5) enters into an agreement with a message sender (e.g., the example sender (Celebrity_D) 504 of FIGS. 3 and 5) to send social media messages (e.g., the example message (Message_X) 114a, the example message (Message_Y) 316 and the example message (Message_Z) 318). Pursuant to the agreement, a list of users (e.g., the example Celebrity_D followers list 505) who follow the example sender 504 is stored by the example AME server 102 in the example storage device 210 of FIGS. 2, 4 and 5. In the illustrated example, the example sender (Celebrity_D) 504 sends the example message (Message_X) 114a, the example message (Message_Y) 316 and the example message (Message_Z) 318, which are received, stored/hosted and distributed by the example message hosting server 104.

In the illustrated example, the social media message 114a is sent from the message hosting server 104 to the example client device 106 without the image (Image_1) 112, but instead includes an automatically activatable link to the image 112. In the illustrated example of FIG. 9, the example message hosting server 104 sends to the client device 106 the example message (Message_X) 114a including an example media placeholder 902 including the example URL (URL_X) 118. In response to accessing the message (Message_X) 114a, the client device 106 sends an example media request 904 addressed to the example URL (URL_X) 118. In the illustrated example, the media request 904 includes a user identifier 514 of the user of the client device 106.

In the illustrated example, the external interface 202 of FIG. 2 receives the media request 904 from the client device 106 requesting the image 112 to be presented with the social media message 114a. As described above in connection to FIGS. 2, 4 and 5, the social message tracker 200 identifies images and social media messages corresponding to the URLs to which media requests are addressed. For example, the social message tracker 200 may use the example data structure 300 of FIG. 3 to determine a requested image and a social media message corresponding to a URL to which the received media request 904 was addressed. For example, the social message tracker 200 looks up the corresponding social media message (Message_X) 114*a* for the URL (URL_X) 118. As a result, the social message tracker 200 credits the message 114*a* with a logged impression by, for example, incrementing a corresponding counter (e.g., one of the counters 208 of FIG. 2). In this manner, the AME server 102 collects or logs impressions of social media messages.

In the illustrated example, the social message tracker 200 also stores a forwarded ID 224 in the entry for the impression to the social media message (Message_X) 114*a* to indicate that the logged impression is an expected media impression as determined by the handle analyzer 214 of FIG. 2. For example, the handle analyzer 214 may receive information from the URL analyzer 204 indicating that the message sender of the message (Message_X) 114*a* is the sender (Celebrity_D) 504. In addition, the example handle analyzer 214 receives a user identifier (e.g., the user identifier 514) from the URL analyzer 204. In the illustrated example, the handle analyzer 214 compares the user identifier 514 to the user identities stored in the Celebrity_D followers list 505. Because the user identifier 514 is listed in the Celebrity_D followers list 505 of FIG. 9, the handle analyzer 214 indicates to the example impression logger 208 that the impression credited for a social media message corresponding to the example media request 904 is an expected media impression (e.g., an unearned media impression). In some examples, the impression logger 208 may store a flag with the user identifier 514 indicating that the user associated with the user identifier 514 has been exposed to the social media message 114*b*. As a result, the example social message tracker 200 may report the number of unique impressions to the social media message (Message_X) 114*b* to, for example, the sponsor 502.

In the illustrated example, the user associated with the user identifier 514 decides to forward the social media message (Message_X) 114*b*. That is, the user associated with the user identifier 514 sends the example message 114 to the example message hosting server 104, thereby enabling followers of the user identifier 514 to read the social media message 114. In the illustrated example, at least some followers of the user identifier 514 are not followers of the celebrity sender 504.

In the illustrated example, the user associated with the user identifier 516 is a follower of the user associated with the user identifier 514. In the illustrated example, when the user associated with the user identifier 514 forwards the message 114*b* to his/her followers via the client device 106, the example message hosting server 104 sends to the client device 107 the example social media message 114*a* including an example media placeholder 902 that includes the example URL (URL_X) 118. In response to accessing the example social media message 114*a*, the client device 107 sends an example media request 908 addressed to the example URL 118. In the illustrated example, the message request 908 includes a user identifier 516 associated with a user of the client device 107. In the illustrated example, the media request 908 is directed to the example AME server 102 to request the image (Image_1) 112. Using a similar process as described above, the example social message tracker 200 looks up the corresponding social media message (Message_X) 114*a* for the URL (URL_X) 118 and credits the example message 114*a* with a corresponding impression by, for example, incrementing a corresponding counter (e.g., one of the counters 208 of FIG. 2).

In the illustrated example of FIG. 9, the social message tracker 200 also stores a forwarded ID 224 in the entry for the impression to the social media message (Message_X) 114*a* to indicate the impression as an unexpected media impression as determined by the handle analyzer 214 of FIG. 2. For example, the handle analyzer 214 receives information from the URL analyzer 204 indicating that the message sender of the message (Message_X) 114*a* is the sender (Celebrity_D) 504. In addition, the example handle analyzer 214 receives a user identifier (e.g., the user identifier 516) from the URL analyzer 204. In the illustrated example, the handle analyzer 214 compares the user identifier 516 to the user identifiers stored in the Celebrity_D followers list 505. In the illustrated example, the user identifier 516 does not match any user identifier stored in the Celebrity_D followers list 505. As a result, the handle analyzer 214 sends information to the example impression logger 208 indicating that the impression credited for the social media message corresponding to the example media request 908 is an unexpected media impression (e.g., an earned media impression). In this manner, the example social message tracker 200 monitors the total impressions and how many of the total impressions were earned media impressions (e.g., paid for media impressions). While the illustrated example describes a social media message forwarded one time, it is also possible for the social media message to be forwarded any number of times. For example, the user associated with the user identifier 516 may also decide to forward (e.g., re-retweet, re-re-convey, etc.) the social media message (Message_X) 114*b*. As a result, one social media message may be forwarded multiple times. In such examples, the social message tracker 200 may use techniques disclosed herein to determine whether an impression credited for a social media message forwarded one or more times is an unexpected media impression or an expected media impression.

FIG. 10 is a flow diagram representative of an example method that may be implemented in connection with the communications flow diagram of FIG. 9 to determine whether an impression is an expected media impression or an unexpected media impression. The program of FIG. 10 begins at block 1002 at which the example external interface 202 (FIG. 2) receives a media request. For example, the external interface 202 receives a media request (e.g., the example media request 904, 908 of FIG. 9) sent by a client device (e.g., the example client device 106, 107 of FIG. 9) to the example AME server 102 (FIG. 9) at the example URL 118 requesting the example image 112 (FIG. 9). In the illustrated example, the example media request includes a user identifier (e.g., the example user identifier 514, 516 of FIG. 9) corresponding to the user utilizing the client device. For example, a user signs into a messaging service using the user identifier 514 to access social media messages conveyed by other users or to convey a social media message.

At block 1004, the social message tracker 200 credits a social media message corresponding to the URL 118 with an impression. For example, the example URL analyzer 204 identifies the example message 114*a* based on the URL 118 using the data structure 300 (FIG. 3), and informs the example impression logger 208 (FIG. 2) to credit the message 114*a* with an impression. In some examples, the impression logger 208 logs an entry when crediting (or logging) a social media message with an impression. In some such examples, the impression logger 208 may add additional information to the entry. For example, the impression logger 208 may store a timestamp, a user identifier and/or device identifier included in the media request, and/or any other information that may provide additional information regarding the impression.

At block 1006, the social message tracker 200 determines a message sender corresponding to the social media message credited with the impression. For example, the URL analyzer 204 looks up the message sender (e.g., the example sender (Celebrity_D) 504) based on the social media message credited with the impression using the data structure 300. In some examples, the handle analyzer 214 (FIG. 2) may look up the message sender using the data structure 300 based on the URL 118 of the media request.

At block 1008, the example social media tracker 200 compares the user identifier to a list of followers subscribed to receive social media messages sent by the message sender. For example, using the identified example message sender 504, the handle analyzer 214 retrieves the example Celebrity_D followers list 505 from the storage device 210 (FIG. 2). The handle analyzer 214 compares the user identifier received from the media request to user identifiers in the Celebrity_D followers list 505. At block 1010, if the user identifier (e.g., the example user identifier 514) matches a user identifier listed in the Celebrity_D followers list 505, the handle analyzer 214 determines that the impression corresponds to an expected media impression and control advances to block 1012. For example, the media request 904 corresponds to accessing the social media message 114b conveyed by the sponsored message sender (Celebrity_D) 504. At block 1012, the handle analyzer 214 sends information to the impression logger 208 indicating that the impression is an expected media impression. The impression logger 208 stores a forwarded ID 224 (FIG. 2) in the impression entry indicating that the impression is an expected media impression (or an unearned media impression) in the impression entry.

Returning to block 1010, if the user identifier (e.g., the example user identifier 516) does not match a user identifier listed in the Celebrity_D followers list 505, the handle analyzer 214 determines that the impression corresponds to an unexpected media impression and control advances to block 1016. For example, the media request 908 corresponds to accessing the social media message 114b conveyed by a subscriber recipient of the original message sender (e.g., the example message sender (Celebrity_D) 504). At block 1016, the handle analyzer 214 sends information to the impression logger 208 indicating that the impression is an unexpected media impression. The impression logger 208 stores in the impression entry a forwarded ID 224 indicating that the impression is an unexpected media impression (or an unearned media impression).

After block 1012 or after block 1016, control advances to block 1014. At block 1014, the social message tracker 200 determines whether there is another media request to process. For example, the example URL analyzer 204 determines whether there is another media request stored in the example message queue 212 (FIG. 2). If the example URL analyzer 204 determines there is another media request in the message queue 212, control returns to block 1004. If the example URL analyzer 204 determines there is not another URL in the message queue, the example process 1000 ends.

Figure 11:
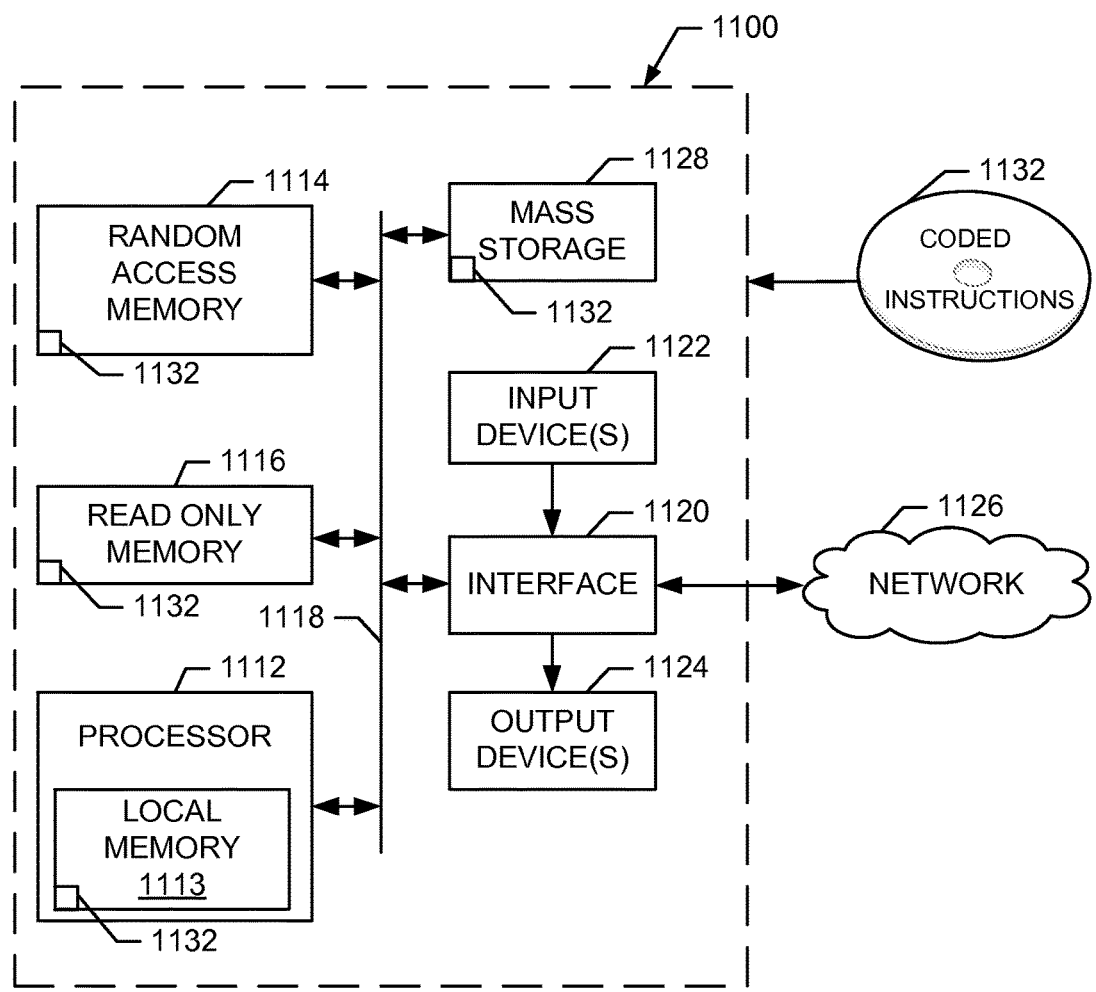
FIG. 11 is a block diagram of an example processor platform capable of executing the example machine readable instructions of FIGS. 6, 7 and 10 to implement the example social message tracker of FIG. 2.

FIG. 11 is a block diagram of an example processor platform 1100 capable of executing the instructions of FIGS. 6, 7 and 10 to implement the social message tracker 200 of FIG. 2. The processor platform 1100 can be, for example, a server, a personal computer, an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a liquid crystal display, a cathode ray tube display (CRT), a touchscreen, a tactile output device, a printer and/or speakers). The interface circuit 1120 of the illustrated example, thus, typically includes a graphics driver card.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. The mass storage device 1128 may implement a local storage device.

The coded instructions 1132 of FIGS. 6, 7 and 10 may be stored in the mass storage device 1128, in the volatile memory 1114, in the non-volatile memory 1116, and/or on a removable tangible computer readable storage medium such as a CD or DVD.

From the foregoing, it will appreciate that the above disclosed methods, apparatus and articles of manufacture enable monitoring exposures to advertisements delivered via social media message and provide a vehicle for detecting the effectiveness of such messages and/or the provider of such messages.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to log impressions of social media messages, the method comprising:

generating, at a first server, a uniform resource locator associated with media to present the media in a social media message;

transmitting, from the first server, the uniform resource locator to a second server to direct the second server to embed the uniform resource locator into the social media message;

receiving, at the first server, a request, the request requesting media and addressed to a uniform resource locator, the request received from a device that automatically sent the request in response to accessing the social media message, the media to be presented in the social media message, and the request including a user identifier;

crediting, at the first server, the social media message with an impression based on the request being addressed to the uniform resource locator and the uniform resource locator being mapped to the social media message;

receiving, at the first server, a list of user identifiers from the second server identifying users that follow an original sender of the social media message;

comparing, at the first server, the user identifier to the list of user identifiers;

crediting, at the first server, the impression to an intended recipient of the social media message when the user identifier is included in the list of user identifiers;

crediting, at the first server, the impression to an unintended recipient of the social media message when the user identifier is not included in the list of user identifiers;

tallying, at the first server, a first count of the impressions credited to intended recipients and a second count of the impressions credited to unintended recipients; and determining, at the first server, a reach of the social media message based on a comparison of the first count to the second count.

2. The method as defined in claim 1, further including, after receiving the request, sending the media to the device that accessed the social media message.

3. The method as defined in claim 2, further including setting a cookie in the device.

4. The method as defined in claim 3, further including mapping demographic information to the cookie.

5. The method as defined in claim 1, further including identifying the media based on a filename in the uniform resource locator.

6. The method as defined in claim 1, wherein a sponsor of the social media message provides the uniform resource locator to the original sender for locating in the social media message.

7. The method as defined in claim 1, wherein a plurality of different uniform resource locators correspond to the same media but different social media messages.

8. The method as defined in claim 7, wherein the plurality of different uniform resource locators corresponding to the same media are assigned to a sponsor of the social media messages.

9. The method as defined in claim 8, wherein the sponsor provides the plurality of different uniform resource locators to the original sender for locating in different social media messages sent by the original sender.

10. An apparatus to log impressions of social media messages comprising:

a first server to:
generate, a uniform resource locator associated with media to present the media in a social media message;

transmit the uniform resource locator to a second server to cause the second server to embed the uniform resource locator into the social media message; and receive a list of user identifiers identifying users that follow an original sender of the social media message from the second server;

an interface to receive a request, the request requesting the media and addressed to the uniform resource locator, the request automatically issued by a device in response to the device accessing the social media message, the media to be presented in the social media message;

an impression logger to:
transmit the media to the device; and
log an impression for the social media message based on the uniform resource locator, the uniform resource locator mapped to the social media message;

a handle analyzer to compare a user identifier in the request to the list of user identifiers; and the impression logger to:
credit the impression to an intended recipient of the social media message when the user identifier is included in the list of user identifiers;
credit the impression to an unintended recipient of the social media message when the user identifier is not included in the list of user identifiers;
tally a first count of the impressions credited to intended recipients and a second count of the impressions credited to unintended recipients; and
determine a reach of the social media message based on a comparison of the first count to the second count.

11. The apparatus as defined in claim 10, further including a uniform resource locator analyzer to select the media based on a filename in the uniform resource locator.

12. The apparatus as defined in claim 11, wherein the uniform resource locator analyzer is to determine the original sender corresponding to the first social media message based on the uniform resource locator.

13. The apparatus as defined in claim 10, wherein the interface is to respond to the request by sending the media to the device.

14. The apparatus as defined in claim 10, wherein the impression logger is to store a timestamp with the impression indicative of when the request was received by the interface.

15. A tangible computer readable storage medium comprising instructions that, when executed, cause a first server to at least:

generate a uniform resource locator associated with media to present the media in a social media message;

transmit the uniform resource locator to a second server to direct the second server to embed the uniform resource locator into the social media message;

respond to a request for the media and addressed to the uniform resource locator by crediting the social media message mapped to the uniform resource locator with an impression based on the request being addressed to the uniform resource locator, the request received from a device that automatically sent the request in response to the device accessing the social media message, the media to be presented in the social media message, and the request including a user identifier;

receive a list of user identifiers from the second server identifying users that follow an original sender of the social media message;

compare the user identifier to the list of user identifiers;

credit the impression to an intended recipient of the social media message when the user identifier is included in the list of user identifiers;

credit the impression to an unintended recipient of the social media message when the user identifier is not included in the list of user identifiers;

tally a first count of the impressions credited to intended recipients and a second count of the impressions credited to unintended recipients; and determine a reach of the social media message based on a comparison of the first count to the second count.

16. The tangible computer readable storage medium as defined in claim 15, the instructions to cause the first server to determine a message sender corresponding to the social media message.

17. The tangible computer readable storage medium as defined in claim 15, the instructions to cause the first server to send the media to the device that accessed the social media message.

18. The tangible computer readable storage medium as defined in claim 15, the instructions to cause the first server to identify the media based on a filename in the uniform resource locator.

19. The tangible computer readable storage medium as defined in claim 15, the instructions to cause the first server to store a timestamp with the impression, the timestamp indicative of when the request was received.

20. A method to log impressions of social media messages comprising:

generating, at a first server, a uniform resource locator associated with media to present the media in a social media message;

transmitting, from the first server, the uniform resource locator to a second server to direct the second server to embed the uniform resource locator into the social media message;

storing, at the first server, an association between the uniform resource locator and the media and an association between the uniform resource locator and the social media message, the media to be presented in the social media message;

providing, with the first server, the uniform resource locator to a message sender device, the uniform resource locator to be sent with the social media message by the message sender device;

receiving, at the first server, a request, the request requesting the media and addressed to the uniform resource locator, the request received from a receiving device different from the message sender device, the receiving device having automatically sent the request in response to accessing the social media message, and the request including a user identifier;

crediting, with the first server, the social media message with an impression based on the request being addressed to the uniform resource locator and the association between the uniform resource locator and the social media message;

receiving, at the first server, a list of user identifiers from the second server identifying users that follow an original sender of the social media message;

comparing, with the first server, the user identifier to the list of user identifiers;

crediting, with the first server, the impression to an intended recipient of the social media message when the user identifier is included in the list of user identifiers;

crediting, with the first server, the impression to an unintended recipient of the social media message when the user identifier is not included in the list of user identifiers;

tallying, at the first server, a first count of the impressions credited to intended recipients and a second count of the impressions credited to unintended recipients; and determining, at the first server, a reach of the social media message based on a comparison of the first count to the second count.

21. The method as defined in claim 20, further including locating the uniform resource locator in the social media message.

22. The method as defined in claim 21, wherein the providing of the uniform resource locator includes providing the uniform resource locator and the social media message to be sent by the message sender device to subscribers in a list of subscribers.

23. The method as defined in claim 20, wherein the message sender device locates the uniform resource locator in the social media message.

24. The method as defined in claim 20, wherein the providing of the uniform resource locator to the message sender device includes providing the uniform resource locator to a sponsor, and instructing the sponsor to provide the uniform resource locator to the message sender device.

* * * * *